United States Patent
Bahk et al.

(10) Patent No.: US 6,950,656 B1
(45) Date of Patent: Sep. 27, 2005

(54) ADAPTIVE ADMISSION CONTROL METHOD AND APPARATUS FOR GUARANTEEING HANDOFF QOS IN A WIRELESS NETWORK

(75) Inventors: Saewoong Bahk, Seoul (KR); Jae-Young Lee, Koyang-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 274 days.

(21) Appl. No.: 09/693,305

(22) Filed: Oct. 20, 2000

(30) Foreign Application Priority Data

Sep. 30, 2000 (KR) .................................... 2000-0057677

(51) Int. Cl.[7] ................................................ H04Q 7/20
(52) U.S. Cl. ...................... 455/436; 455/439; 455/442; 455/443; 455/446; 455/450; 455/453; 455/456.1; 455/464; 455/437; 370/331; 370/332
(58) Field of Search .............................. 455/443, 436, 455/437, 438, 439, 453, 442, 446, 450, 456.1, 464; 370/331, 332

(56) References Cited

U.S. PATENT DOCUMENTS 5,884,174 A * 3/1999 Nagarajan et al. .......... 455/436
6,385,449 B2 * 5/2002 Eriksson et al. ............ 455/436

OTHER PUBLICATIONS

GSM Network Optimization, May 2000.*

* cited by examiner

Primary Examiner—David Hudspeth
Assistant Examiner—David Nguyen
(74) Attorney, Agent, or Firm—Cha & Reiter, L.L.C.

(57) ABSTRACT

An adaptive control apparatus for keeping a dropping probability of a handoff call requested without user mobility information below a predefined level, to guarantee a quality of service (QoS). The apparatus adaptively controls an admission threshold of each cell in a wireless network to maintain the handoff dropping probability below a predefined level. The admission threshold is dynamically adjusted based on handoff drop events. The apparatus can guarantee QoS and maximize channel utilization. Since the apparatus is simply based on the handoff drop events of each cell rather than mobility of the respective calls, it is possible to remarkably decrease the complexity as compared with the existing mobile-oriented apparatus. In addition, the apparatus can solve the inter-cell unfairness problem.

26 Claims, 30 Drawing Sheets

ADAPTIVE ADMISSION CONTROL METHOD AND APPARATUS FOR GUARANTEEING HANDOFF QOS IN A WIRELESS NETWORK

CLAIM OF PRIORITY

This application makes reference to and claims all benefits accruing under 35 U.S.C. Section 119 from an application entitled "ADAPTIVE ADMISSION CONTROL METHOD AND APPARATUS FOR GUARANTEEING HANDOFF QOS IN A WIRELESS NETWORK" filed in the Korean Industrial Property Office on Sep. 30, 2000 and there duly assigned Serial No. 99-57677.

BACKGROUND OF THE INVENTION

1. Field of the Invention

The present invention relates generally to an apparatus and method for controlling a drop of a requested call in a wireless network. More particularly, the present invention relates to an apparatus and method for guaranteeing a quality of service (QoS) by keeping a dropping probability of a handoff call requested without user mobility information below a predefined level.

2. Description of the Related Art

Recently, the population of mobile users, particularly among those using systems such as CDMA (Code Division Multiple Access), PCS (Personal Communication System), and GSM (Global System for Mobile communication), has grown at a rapid rate. Also, the demand has increased for multimedia applications requiring high bandwidth, such as high quality video. Therefore, the current trend in wireless networks is to decrease cell sizes (into micro-cells or pico-cells) to provide higher capacity and accommodate more users in a given area. However, smaller cell sizes increase the frequency of handoffs, which results in rapid changes in the conditions of the network traffic. Thus, the QoS provisioning in wireless networks becomes more difficult to achieve.

One of the important QoS issues in wireless networks is how to control handoff drops. When a mobile user moves into an adjacent cell during a session, a handoff occurs and the mobile user communicates continuously through the new base station (BS). However, the handoff could fail if the available bandwidth in the new cell is insufficient for the mobile user. Such a failure is referred to as "a handoff drop".

In general, a handoff drop is considered to have more of a negative impact on a users' perception of quality than does a new call block. As a result, there are required strategies for prioritizing handoff calls over new calls, for example, such as reserving a portion bandwidth exclusively for handoffs. The concept of the bandwidth reservation for handoffs was first introduced in mid-80s (see D. Hong and S. S. Rappaport, "*Traffic model and performance analysis of cellular radio telephone systems with prioritized and non-prioritized handoff procedures,*" IEEE Trans. on Vehicular Technology, 35(3), August 1986). Since then, various strategies that give priority to handoffs have been studied.

Ideally, it would be desirable if handoff drops never occur. However, this would require the network to reserve so much bandwidth in all cells in which a particular mobile unit might enter, and would result in very low channel utilization and/or high new call blocking probability $P_b$. Therefore, another approach is to provide probabilistic QoS guarantees by keeping the handoff dropping probability $P_d$ below a certain level, rather than eliminate it completely.

In a paper, M. Naghshineh and M. Schwartz, "*Distributed Call Admission Control in Mobile/Wireless Networks,*" IEEE Journal on Selected Areas in Communications, 14(4), May 1996, the admission threshold to satisfy the QoS constraint is a calculation based on the number of users in the current cell and adjacent cells, given the probability that a mobile unit would be handed-off within some time interval. However, this scheme does not specify how to predict the user mobility, and such predictability is essential in their scheme, and assumes the exponential distribution of the cell residence time.

In practice, the cell residence time may not be exponentially distributed (see M. M. Zonoozi and P. Dassanayake, "*User Mobility Modeling and Characterization of Mobility Patterns,*" IEEE Journal on Selected Areas in Communications, 15(7), September 1997).

Moreover, another paper, authored by O. T. W. Yu and V. C. M. Leung, "*Adaptive Resource Allocation for Prioritized Call Admission Over an ATM-based Wireless PCN,*" IEEE Journal on Selected Areas in Communications, 15(7), September 1997, also proposes a technique to compute the reserved bandwidth to maintain the handoff dropping probability $P_d$ within a specified level. However, the paper also assumes the exponentially distributed cell residence time.

In yet another paper, D. Levine, I. Akyildiz, and M. Naghshineh, "A *Resource Estimation and Call Admission Algorithm for Wireless Multimedia Networks Using the Shadow Cluster Concept,*" IEEE/ACM Trans. on Networking, 5(1), February 1997, the shadow cluster concept has been used as a way to estimate future resource requirements and perform admission control in order to limit the handoff dropping probability $P_d$. In this scheme, mobiles inform the base stations (BSs) in neighboring cells of their bandwidth requirements and movement patterns at the call setup time. Based on this set of information, the BSs predict future demands and admit only those mobiles that can be supported adequately. The drawback of this particular scheme is that precise user mobility should be known a priori, which is impractical, and it requires the exchange of a large number of messages among BSs.

A more practical method of predicting the user mobility has been presented quite recently in a paper, by S. Choi and K. G. Shin, "*Predictive and Adaptive Bandwidth Reservation for Handoffs in QoS-Sensitive Cellular Networks,*" in Proc. ACM SIGCOMM'98, pp. 155–166, September 1998. This method uses the adaptive and predictive bandwidth reservation scheme to provide probabilistic QoS guarantees. Herein, the method disclosed in this paper will be referred to as "CS98". This CS98 scheme is based on the observed history of mobility information to calculate the reserved bandwidth.

In CS98, a predictive and adaptive bandwidth reservation scheme is proposed. First, user mobility is estimated based on an aggregate history of handoffs observed in each cell. This user mobility information is then used to (probabilistically) predict mobiles' moving directions and handoff times. For each cell, the bandwidth to be reserved for handoffs is calculated by estimating the total sum of fractional bandwidths of the expected handoffs within a estimation time window $T_{est}$. The estimation time window $T_{est}$ is adaptively controlled for the efficient use of bandwidth and effective response to (i) time-varying traffic/mobility and (ii) inaccuracy of mobility estimation.

Although the CS98 scheme is not based on any impractical assumptions, it has still high complexity (see S. Choi and K. G. Shin, "*Comparison of Connection Admission*

Control Schemes in the Presence of Handoffs in Cellular Networks," in Proc. ACM/IEEE Mobicom'98, October 1998). This is because, in the CS98 scheme, a rather complex history-based method is used to calculate the target reserved bandwidth. Handoff events must be cached and the handoff probability of every call in adjacent cells must be calculated every time a new call is tested for admission.

Here, it should be noted that many previous schemes were based on the user mobility information, called "mobile-oriented reservation schemes". If the design goal is to reduce handoff drops to as little as possible, then the user mobility information should be used to predict mobiles' handoff times and next cells and to reserve some bandwidths for those mobile users. However, if the design goal is to keep the handoff dropping probability $P_d$ below a certain level, the user mobility information is not essential. It should be noted that a handoff drop is basically a cell-oriented event (i.e., a handoff drop occurs when a cell is overloaded).

There is another practical scheme in which the cell-oriented policy was introduced (see C. Oliveira, J. B. Kim and T. Suda, "An Adaptive Bandwidth Reservation Scheme for High-Speed Multimedia Wireless Networks," IEEE Journal on Selected Areas in Communications, 16(6), August 1998). Herein, this scheme will be referred to as "OKS98 scheme". This OKS98 scheme determines the amount of reserved bandwidth by the largest of all the requested bandwidths from adjacent cells. After some bandwidth is reserved, it is dynamically adjusted at each cell to keep the handoff dropping probability $P_d$ below a target value.

However, this original adaptive algorithm in OKS98 has some un-specified aspects. First, there is no mention about the monitored period of the handoff dropping probability $P_d$. Second, it is not clear when to increase or decrease R. In addition, this OKS98 scheme has the inter-cell unfairness problem.

SUMMARY OF THE INVENTION

It is, therefore, an object of the present invention to provide an apparatus and method for maintaining a dropping probability of a handoff call requested without user mobility information below a specified level in a wireless network.

It is another object of the present invention to provide an apparatus and method for simplifying a process of maintaining a handoff drop probability below a specified level in a wireless network.

It is further another object of the present invention to provide an apparatus and method for solving the inter-cell unfairness problem occurring when maintaining the handoff dropping probability to a specified level in a wireless network.

To achieve the above and other objects, an adaptive control apparatus according to the present invention keeps a dropping probability of a handoff call requested without user mobility information below a predefined level, to guarantee a quality of service (QoS). The apparatus adaptively controls an admission threshold of each cell in a wireless network to maintain the handoff dropping probability below a predefined level. The admission threshold is dynamically adjusted based on handoff drop events. The apparatus can guarantee QoS and maximize channel utilization. Since the apparatus is simply based on the handoff drop events of each cell rather than mobility of the respective calls, it is possible to remarkably decrease the complexity as compared with the existing mobile-oriented apparatus. In addition, the apparatus can solve the inter-cell unfairness problem.

In accordance with one aspect of the present invention, there is provided a method for controlling admission of a requested handoff call in a wireless network including a plurality of cells, wherein a mobile controls admission of the requested handoff call, when a handoff call is requested to one of a plurality of cells adjacent to one of the cells in communication with the mobile. The method comprises: (a) comparing, upon receipt of a new call request to the adjacent cell, a sum of an allocated bandwidth of said adjacent cell and a bandwidth for the requested new call with an admission threshold of said adjacent cell, and determining whether to admit or block the requested new call; (b) monitoring the number of handoff drops versus the number of requested handoff calls for a first term; (c) adjusting the admission threshold according to the monitoring result and a target handoff dropping probability for guaranteeing a quality of service (QoS); (d) transmitting a message for adjusting an admission threshold according to adjustment of the admission threshold; and (e) repeating the steps (b) to (d) for the next first term, while changing a value of a second term until a target call blocking probability is satisfied during the second term which is longer than or equal to the first term and includes the first term.

BRIEF DESCRIPTION OF THE DRAWINGS

The above and other objects, features and advantages of the present invention will become more apparent from the following detailed description when taken in conjunction with the accompanying drawings in which:

FIGS. 15A to 22B are diagrams illustrating the results of simulations performed to evaluate performances of the embodiments AC1, AC2 and AC3 of the present invention, wherein FIGS. 15A and 15B are diagrams illustrating a relationship between probabilities $P_b$ and $P_d$ and utilization according to the offered load, with respect to the embodiments AC1, AC2 and AC3 of the present invention;

FIGS. 22A and 22B are diagrams illustrating a complexity of calculations and the number of signaling messages, with respect to the prior art CS98 and the embodiment AC3 of the present invention.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail since they would obscure the invention in unnecessary detail.

Figure 1B:
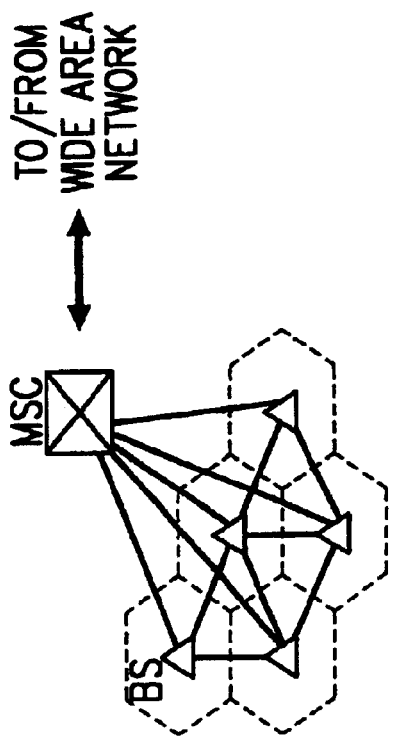
FIGS. 1A and 1B are diagrams illustrating the topology of base stations in a wireless network to which the present invention is applicable.
Figure 1A:
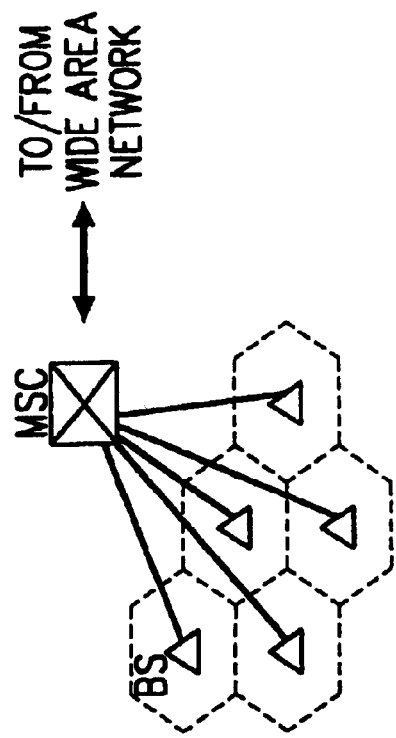

The present invention relates to an apparatus and method for keeping a handoff dropping probability below a predefined level, by adaptively controlling an admission threshold of each cell based on handoff dropping events in a wireless network having the topology comprised of a plurality of cells, as shown in FIG. 1A or 1B. The topology of the base stations constituting the wireless network, to which the present invention is applicable, can have the structure of a start topology shown in FIG. 1A or the structure of a fully-connected topology shown in FIG. 1B.

Referring to FIGS. 1A and 1B, a node of a mobile switching center (MSC) covers a plurality of base stations (BSs) and serves as a gateway between the base stations and a wide-area network. In the structure of the start topology of FIG. 1A, the mobile switching center is connected to the respective base stations and the base stations are not directly connected to one another. This is the typical topology implemented in the existing cellular communication system.

In the structure of the fully-connected topology of FIG. 1B, the mobile switching is connected to the respective base stations and the base stations can directly communicate with one another without passing through the mobile switching center. The base stations each can be divided into a base station transceiver subsystem (BTS) corresponding to each cell and a base station controller (BSC) for controlling the base station transceiver subsystem. The base station controller of each cell constituting the wireless network performs a test for deciding admission of a requested call and adaptively adjusts an admission threshold used to decide admission of a requested call according to the present invention.

A description of the present invention will be made in the following order. First, a simple admission test T1 will be described for deciding admission of a newly requested call according to an embodiment of the present invention. Second, an adaptive control algorithm A1 will be described for adjusting an admission threshold according to an embodiment of the present invention. Third, the inter-cell unfairness problem will be analyzed. Fourth, an enhanced admission test T2 will be described for guaranteeing inter-cell fairness according to an embodiment of the present invention. Fifth, an enhanced adaptive control algorithm A2 will be described for guaranteeing inter-cell fairness and adjusting the admission threshold according to an embodiment of the present invention. Sixth, a description will be made of an adaptive control apparatus for adjusting an admission threshold used to decide admission of a requested call according to the embodiments of the present invention. Seventh, a comparison will be made between performance of the embodiments and performance of the prior art.

Before a detailed description of the invention, the terms used herein will be defined in Table 1 below.

TABLE 1

| | |
|---|---|
| $P_d$: | handoff dropping probability |
| $P_b$: | new call blocking probability |
| $P_{QoS}$: | handoff dropping probability to guarantee QoS |
| $C(i)$: | capacity of cell i |
| $C_a(i)$: | allocated bandwidth of cell i |
| $T(i)$: | admission threshold of cell i |
| $T_{opt}$: | optimal admission threshold of each cell |
| BU: | minimum quota of bandwidth resource assigned to a mobile |
| $S_P$: | short-term period |
| $S_H$: | count value for short-term handoff attempts |
| $S_{HD}$: | count value for short-term handoff drops |
| $L_P$: | long-term period |
| $L_H$: | count value for long-term handoff attempts |
| $L_{HD}$: | count value for long-term handoff drops |

System Model and Simple Admission Control

In the embodiments of the present invention, a mobile network with a cellular infrastructure is considered. Herein, it will be assumed that the system uses a fixed channel allocation (FCA) scheme and each cell i has a capacity $C(i)$. Further, the service model accommodates multiple classes of traffic (e.g., voice and video). Let BU be the minimum quota of bandwidth resource that can be assigned to any mobile. In the description below, 1 BU is the bandwidth required by one voice call.

A. Admission Test (T1)

A new call setup request is accepted into cell i through the following admission test named T1:

$$C_a(i) + B_{new} \leq T(i) \tag{1}$$

where $C_a(i)$ is the allocated bandwidth of cell i, $B_{new}$ is the required bandwidth of the new call, and $T(i)$ is the admission threshold of cell i. This indicates that a new call request is accepted if the allocated bandwidth plus the bandwidth of the call is less than or equal to the admission threshold.

However, in case of a handoff call, it is accepted into the new cell i if there is any free bandwidth to accept the handoff call requiring the bandwidth $B_{handoff}$. That is $$C_a(i) + B_{handoff} \leq C(i) \qquad (2)$$

where $C_a(i)$ is the allocated bandwidth of cell i, $B_{handoff}$ is the bandwidth requested by a handoff call, and C(i) is the capability of the cell i. This indicates that a handoff call request is accepted if the allocated bandwidth plus the bandwidth requested for the handoff call is less than or equal to the capability.

Figure 2:
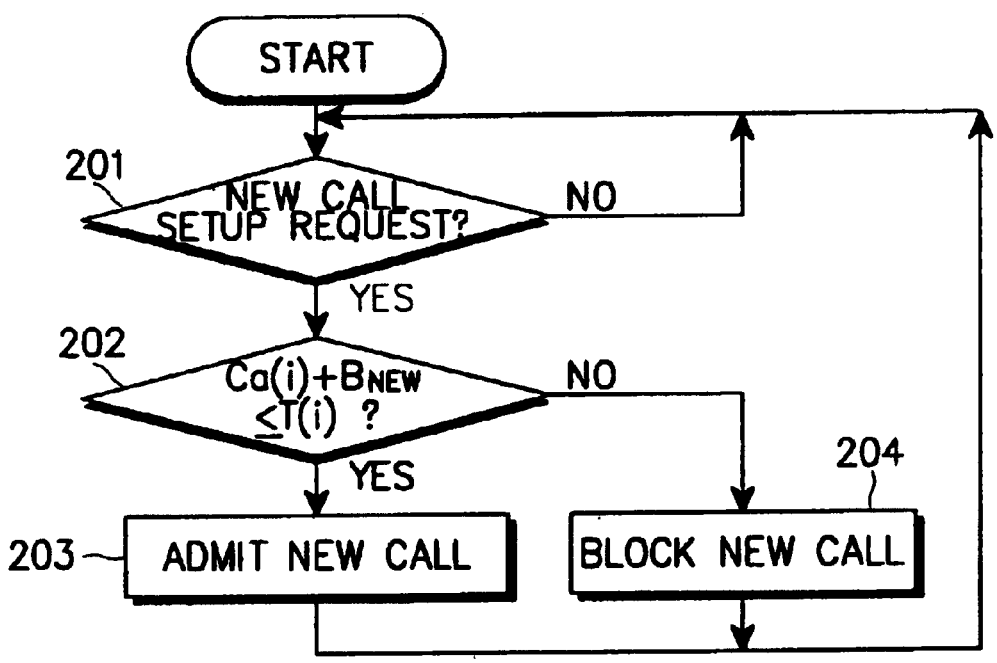
FIG. 2 is a flow chart illustrating a procedure for testing, upon receipt of a new call setup request, whether to admit the call according to an embodiment T1 of the present invention.
Figure 3:
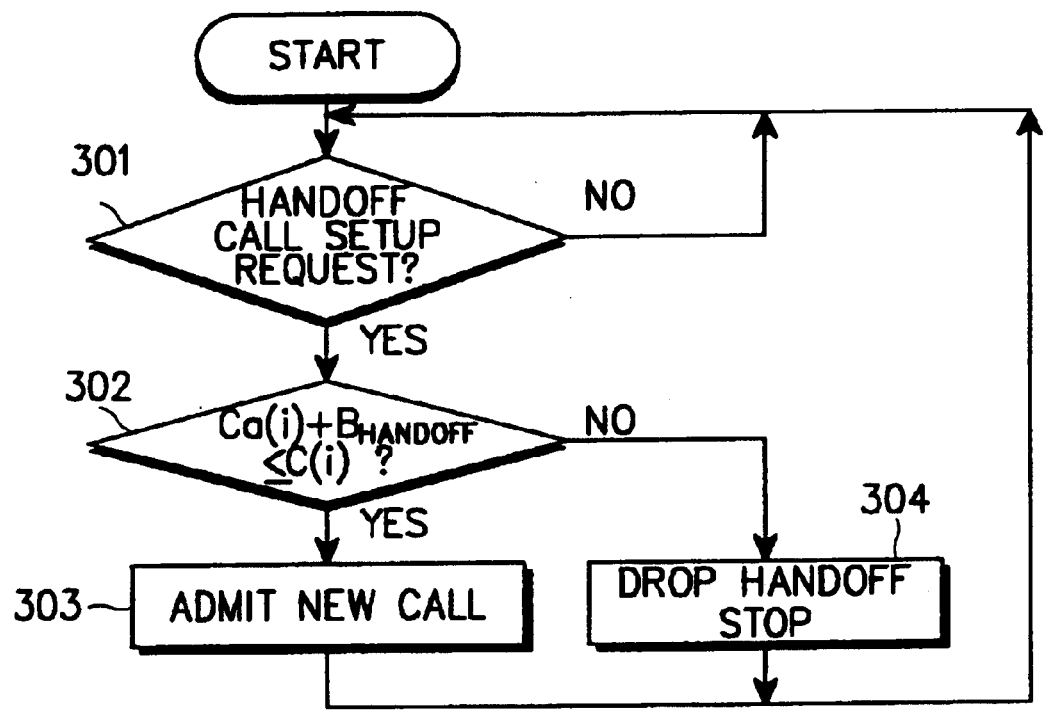
FIG. 3 is a flow chart illustrating a procedure for testing, upon receipt of a handoff call setup request, whether to admit the call according to an embodiment T1 of the present invention.

FIGS. 2 and 3 illustrate the call admission test procedures according to the embodiment T1 of the present invention. Specifically, FIG. 2 illustrates a procedure for testing, upon receipt of a new call setup request, whether to admit the call. In addition, FIG. 3 illustrates a procedure for testing, upon receipt of a handoff call setup request, whether to admit the call.

Referring to FIG. 2, the base station controller determines in step 201 whether a new call setup request has occurred. If it is determined that a new call setup request has occurred, the base station controller performs a decision operation in accordance with Equation (1) in step 202. If it is determined in step 202 that the allocated bandwidth plus the bandwidth of the new call is less than or equal to the admission threshold of the cell i, the base station controller admits the new call in step 203. Otherwise, if it is determined in step 202 that the allocated bandwidth plus the bandwidth of the new call is larger than the admission threshold, the base station controller blocks the new call in step 204.

Referring to FIG. 3, the base station controller determines in step 301 whether a handoff call setup request has occurred. If it is determined that a handoff call setup request has occurred, the base station controller performs a decision operation in accordance with Equation (2) in step 302. If it is determined in step 302 that the allocated bandwidth plus the bandwidth requested for the handoff call is less than or equal to the capability of the new cell i, the base station controller admits the handoff call in step 303. Otherwise, if it is determined in step 302 that the allocated bandwidth plus the bandwidth requested for the handoff call is larger than the capability, the base station controller drops the handoff call in step 304.

As described above, this admission test gives priority to handoff calls over new calls. Therefore, C(i)-T(i) can be interpreted as the reserved bandwidth for handoffs in cell i.

B. Adaptive Control Algorithm to Adjust the Admission Threshold (A1)

There might exist an optimal admission threshold $T_{opt}$ in each cell for specific traffic load and user mobility. Here, the term "optimal" is used in the sense of maximizing (minimizing) the utilization $P_b$ while keeping $P_d$ below a target value $P_{QoS}$. If the admission threshold T is below the optimal admission threshold $T_{opt}$, utilization can be improved by increasing the admission threshold T. On the other hand, if the admission threshold T is above the optimal admission threshold $T_{opt}$, the admission threshold T must be decreased to keep the handoff dropping probability $P_d$ below the target value $P_{QoS}$. The point is how to adjust the admission threshold T as close as possible to, but not over the optimal admission threshold $T_{opt}$. The invention proposes an adaptive algorithm to adjust the admission threshold based on monitored handoff dropping events in each cell. The following shows the algorithm called A1 that is executed by the BS of each cell in a distributed manner.

TABLE 2

1. $S_P = \lceil 1/P_{QoS} \rceil$; $L_P = S_P$;
2. $S_H = 0$; $S_{HD} = 0$; $L_H = 0$; $L_{HD} = 0$; $T = T_{init}$;
3. WHILE (time increases) {
4.     IF (a mobile handoffs into the current cell) THEN {
5.         $S_H = S_H + 1$; $L_H = L_H + 1$;
6.         IF (it is dropped) THEN {
7.             $S_{HD} = S_{HD} + 1$; $L_{HD} = L_{HD} + 1$;
8.             IF ($L_{HD} > 1$) THEN {
9.                 $L_P = L_P + S_P$;
10.                 $T = \max(T - d, T_{min})$;
11.             }
12.         }
13.         IF ($S_H == S_P$) THEN {
14.             IF ($S_{HD} < 1$) THEN
15.                 $T = \min(T + d, T_{max})$;
16.             $S_H = 0$; $S_{HD} = 0$;
17.             IF ($L_H == L_P$) THEN {
18.                 $L_H = 0$; $L_{HD} = 0$; $L_P = S_P$;
19.             }
20.         }
21.     }
22. }

The main idea of Table 2 is to monitor the handoff dropping events for both short-term and long-term. The objective of the long-term monitoring is to keep the handoff dropping probability $P_d$ below the target handoff dropping probability PQoS. The short-term monitoring is to maximize the channel utilization.

Figure 4:
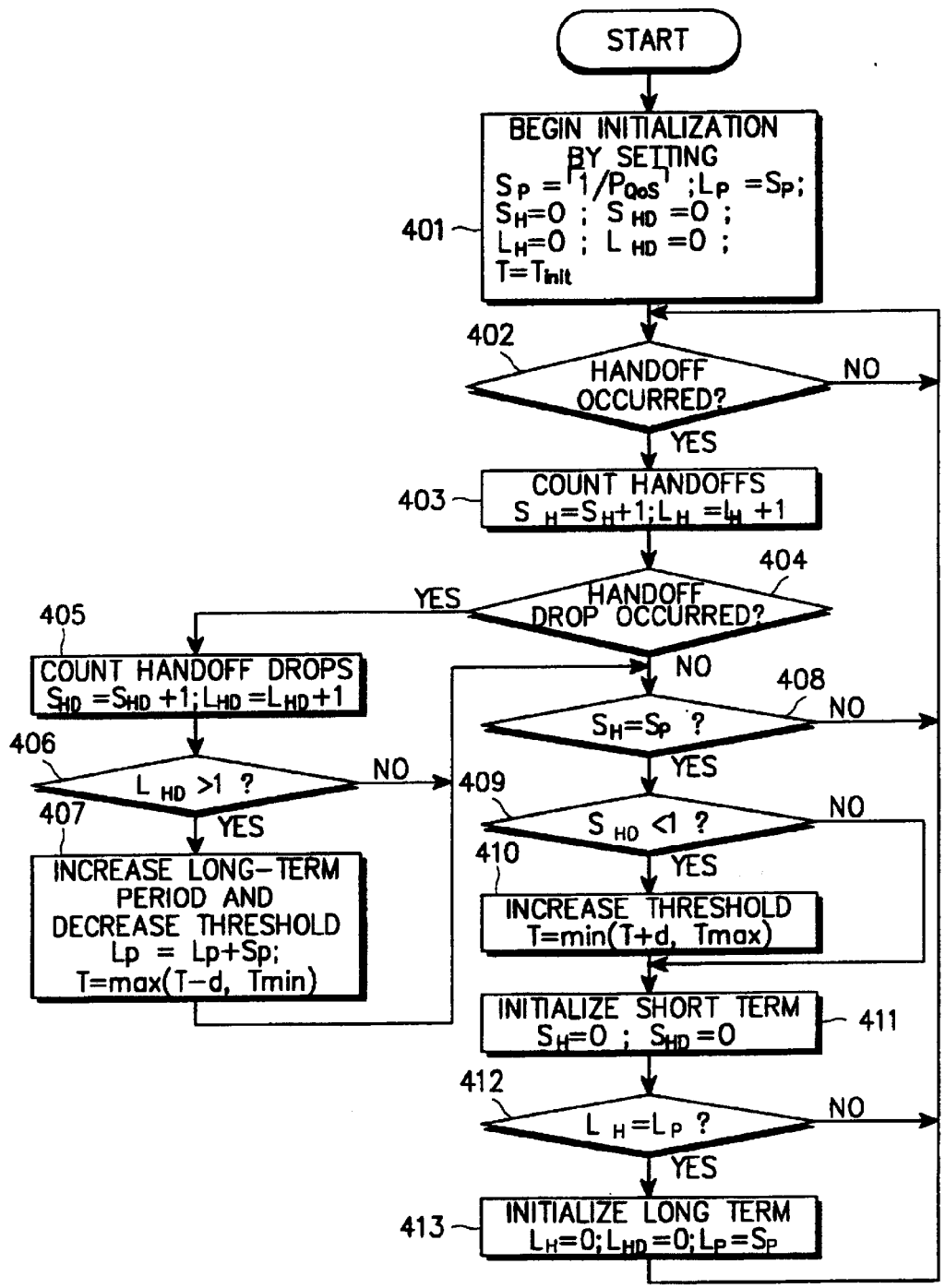
FIG. 4 is a flow chart illustrating a procedure of an adaptive control algorithm for adjusting an admission threshold according to an embodiment A1 of the present invention.

FIG. 4 illustrates a procedure of an adaptive control algorithm for adjusting an admission threshold according to an embodiment A1 of the present invention. The procedure of FIG. 4 is based on the algorithm A1 shown in Table 2. Herein, the invention will be described for the case of the target handoff dropping probability of 0.01, i.e., for the case where one handoff drop occurs for a predetermined term in which 100 handoff drops occur. Therefore, although it will be determined herein whether the count of handoff drops $L_{HD}$ exceeds '1', the count of handoff drops may be varied according to the target handoff dropping probability.

Referring to FIG. 4, an initialization operation is performed in step 401. In step 401, the short-term period $S_P$ is determined by handoff attempts as $[1/P_{Qos}]$. The counts for the short-term handoff attempts $S_H$ and handoff drops $S_{HD}$ are reset to '0' at the start of each period. The long-term period $L_P$ is determined by handoff attempts as $S_P \times \max(L_{HD}, 1)$ where $L_{HD}$ is the count for the long-term handoff drops. Also, the counts for the long-term handoff attempts $L_H$ and handoff drops $L_{HD}$ are reset to '0' at the start of each long-term period. At the beginning, the long-term period $L_P$ is set to the short-term period $S_P$.

After step 401, it is determined in step 402 whether a handoff has occurred. When the handoff has occurred, the handoff is counted in step 403. That is, the counts for the short-term handoff attempts and long-term handoff attempts $S_H$ and $L_H$ are increased by one in step 403.

Next, it is determined in step 404 whether the occurred handoff is dropped. If it is determined that the occurred handoff is dropped, steps 405 to 407 are performed. Otherwise, steps 408 to 413 are performed.

If it is determined that the handoff is dropped, the handoff drop is counted in step 405. That is, the handoff drop counts $S_{HD}$ and $L_{HD}$ set in step 401 are increased by one. If it is determined in step 406 that the count for the long-term handoff drops $L_{HD}$ is larger than '1', an operation of increasing the long-term ($L_P = L_P + S_P$) and an operation of decreasing the admission threshold and accordingly determining the admission threshold (T=max (T-d,Tmin)) are performed in step 407. Here, the long-term period $L_P$ is increased by the short-term period $S_P$ in addition to the initial long-term period, and the admission threshold T is decreased by a predetermined value 'd' from the initial admission threshold and then determined as the higher admission threshold out of the decreased admission threshold (T−d) and a preset minimum admission threshold $T_{min}$. After step 407, or if it is determined in step 406 that the count for the long-term handoff drops $L_{HD}$ is not larger than '1' (i.e., one handoff drop has occurred in the predetermined long-term period), the procedure proceeds to step 408.

In step 408, it is determined whether the count for the short-term handoff attempts $S_H$ is equal to the count for the short-term period $S_P$. If they are not equal to each other, the procedure returns to step 402. Otherwise, if they are equal to each other, it is determined in step 409 whether the count for the short-term handoff drops $S_{HD}$ is less than '1'. If it is determined in step 409 that $S_{HD}$ is less than '1', steps 410 and 411 are performed. Otherwise, step 411 is performed after skipping step 410. In step 410, an operation of increasing the admission threshold (T=min(T+d,Tmax) is performed. Here, the admission threshold T is increased by a predetermined value 'd' in addition to the initial admission threshold and then determined as the lower admission threshold out of the increased admission threshold (T+d) and the previous maximum admission threshold $T_{max}$. In step 411, an operation of initializing the short term ($S_H$=0; $S_{HD}$=0) is performed.

$T_{max}$ and $T_{min}$ indicate the preset maximum admission threshold and the present minimum admission threshold, respectively. The maximum admission threshold $T_{max}$ is set to the total channel capacity C, and the minimum admission threshold $T_{min}$ is set to '0'. For example, when the cell capacity is 100 BU, the admission threshold T is determined between $T_{max}$ (100 BU) and $T_{min}$ (0 BU). For the handoff dropping probability $P_d$=0.01, the admission threshold T should be determined near 90 BU. Of course, the value 90 BU can be varied according to the user mobility and the load. The increment and decrement step size 'd' of the admission threshold is determined according to Equation (5) below. If there exists only a voice user in a specific cell, who uses only 1 BU, d=1 BU. However, if there exist a voice user of 1 BU and a video user of 4 BU at a ratio of 1:1 in a specific cell, d=(1+4)/2=2.5 BU.

After step 411, it is determined in step 412 whether the count for the long-term handoff attempts $L_H$ is equal to the long-term period $L_{HD}$. If they are equal, an operation of initializing the long term ($L_H$=0; $L_{HD}$=0; $L_P$=$S_P$) is performed in step 413. After step 413, or if it is determined in step 412 that they are not equal, the procedure returns to step 402.

The procedure of FIG. 4 can be divided into state 1 and state 2 based on monitored handoff attempts for the first $L_P$. When one or no handoff drop occurs for the first $L_P$ (=$S_P$) handoff attempts, state 1 will be performed. When more than one handoff drops occur for the first $L_P$ handoff attempts, state 2 will be performed.

1) State 1

When one or no handoff drop occurs for the first $L_P$ (=$S_P$) handoff attempts, the system enters state 1. In state 1, the dropping probability is $$P_d = \frac{L_{HD}}{L_H} \leq \frac{1}{L_P} = \frac{1}{S_P} \approx P_{QoS} \quad (3)$$

Therefore, $P_d$ during this period is kept below $P_{Qos}$. If no handoff drop has occurred, it is probable that T<$T_{opt}$. As a result, T is increased by a predetermined step size d (Step 410). In state 1, since the conditions of steps 408 and 412 are all satisfied, the long-term ends with the short-term and the system state immediately goes to the initial state.

2) State 2

When more than two handoff drops occur for the first $L_P$ handoff attempts, the system enters state 2. Once state 2 starts, $L_P$ is increased by $S_P$ and T is decreased by d whenever a handoff drop occurs (Step 407). State 2 goes to the initial state when $L_H$=$L_P$ in step 412. In state 2, the first short-term dropping probability is above the target value. Therefore, T will be near $T_{opt}$ within some time by decreasing T whenever a handoff drop occurs. That is, the overall long-term dropping probability is maintained at the target value.

$$P_d = \frac{L_{HD}}{L_H} = \frac{L_{HD}}{L_P} = \frac{L_{HD}}{S_P L_{HD}} = \frac{1}{S_P} \approx P_{QoS} \quad (4)$$

If the increment and decrement step size d is too large, it may result in an over-reaction, i.e., fluctuation between over-reservation and under-reservation. But, if it is too small, it may result in an under-reaction. Thus, d must be carefully chosen. 1 BU is found to be desirable for the single class of voice traffic. In general, when there are M classes of traffic, the step size $$d = \sum_{i=1}^{M} F_i B_i \quad (5)$$

is found to be a reasonable choice, where $F_i$ is the fraction of the call requests for class i and $B_i$ is the required bandwidth of a class i call in BU. $F_i$ may be determined from the traffic history available to the BS. If a particular traffic class k is dominant, d is almost the same as $B_k$.

Figure 5:
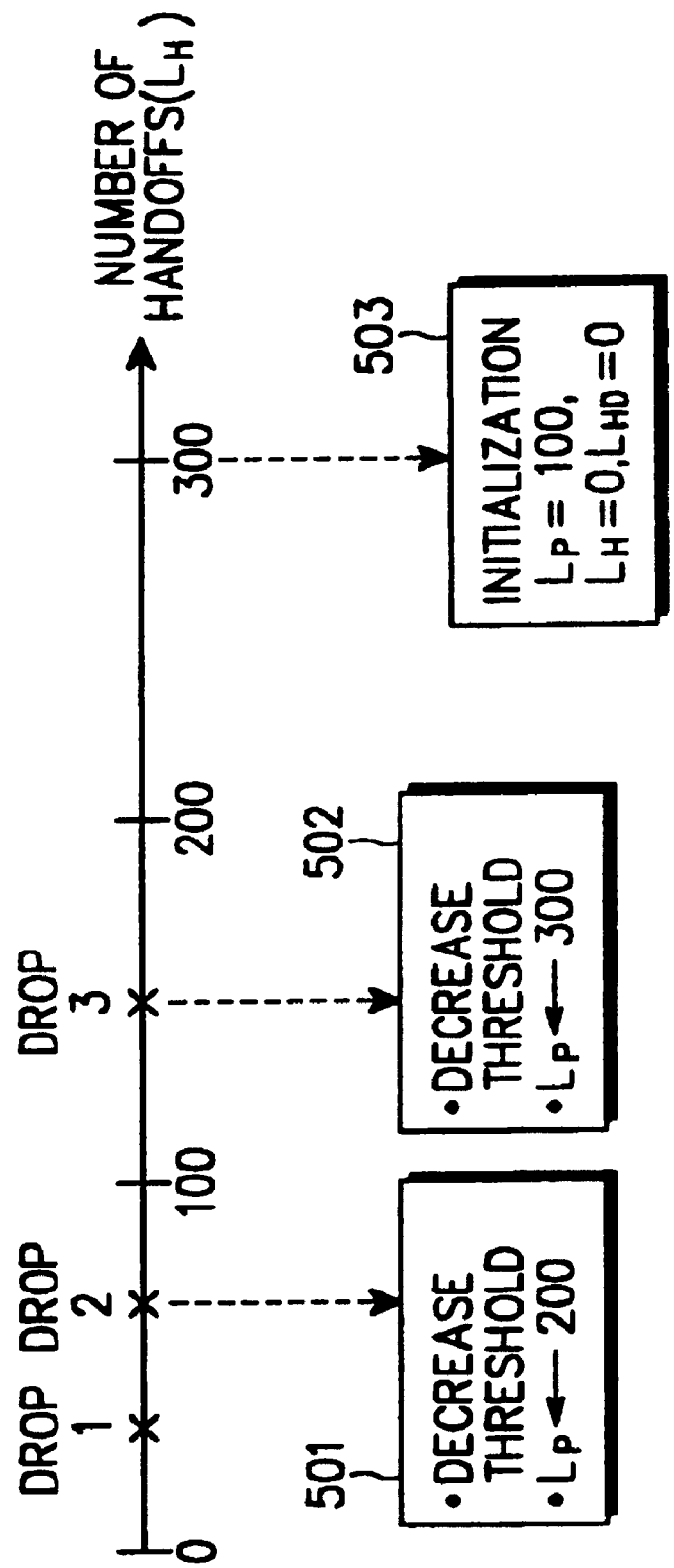
FIG. 5 is a diagram illustrating an exemplary operation of adjusting an admission threshold according to the adaptive control algorithm A1 of FIG. 4.

FIG. 5 illustrates an exemplary operation of adjusting an admission threshold according to the adaptive control algorithm A1 of FIG. 4.

Referring to FIG. 5, 'X' indicates a handoff drop occurred while observing the long-term handoff attempts $L_H$. When the handoff drop occurs, the long-term period $L_P$ is changed, satisfying the target handoff dropping probability $P_{Qos}$ of the handoff dropping probability $P_d$. As described above, the algorithm A1 monitors the handoff dropping events for both the short term and the long term. The objective of the short-term monitoring is to maximize the utilization, and the objective of the long-term monitoring is to keep the handoff dropping probability $P_d$ below the target value $P_{QoS}$.

For example, assume that the target handoff dropping probability $P_{Qos}$=0.01. Then, the short-term period $S_P$ and the long-term period $L_P$ are initially set to 100 (=1/0.01). Hence, in an ideal state, one handoff drop occurs out of 100 handoff attempts.

1) Occurrence of One Handoff Drop (DROP 1)

Since the QoS is not violated yet, the handoffs and the handoff drops are continuously monitored.

2) Occurrence of Two Handoff Drops (DROP 2)

Since 2 handoff drops have occurred before monitoring 100 handoffs, $P_d$>0.01. Therefore, the admission threshold is decreased to accept the less number of users, and the long-term period $L_P$ is increased to 200 (Step 501).

3) Occurrence of Three Handoff Drops (DROP 3)

The admission threshold is decreased and the long-term period $L_P$ is further increased by 100 (Step 502).

As can be appreciated from the foregoing descriptions, once it becomes that $L_{HD}$>1, the admission threshold is decreased and the long-term period $L_P$ is increased by 100 whenever a handoff drop occurs. Then, the handoff dropping probability becomes $P_d=3/300=0.01$ at the end of the long-term period $L_H=L_P=300$, thus satisfying $P_d=0.01$ in terms of the long-term period.

Meanwhile, no handoff drop has occurred during the last short-term period of $200<L_H\leq300$. In this case, the admission threshold is increased, on the judgment that the admission threshold is too low.

At the point where the count for the long-term handoff attempts becomes $L_H=300$, the long-term period is initialized to $L_P100$, the count for the long-term handoff attempts is initialized to $L_H=0$, and the count for the handoff drops is initialized to $L_{HD}=0$ (Step 503). Thereafter, the monitoring is started again.

Inter-cell Unfairness Problem

When the offered load is light or the user mobility is low, AC1 works well. Here, AC1 refers to an admission control scheme using the admission test T1 and the adaptive algorithm A1.

However, when the offered load is heavy and the user mobility is high, an undesirable situation can happen. When the BS of a cell dynamically adjusts its admission threshold regardless of the status of its adjacent cells as in AC1, the inter-cell unfairness problem may occur (see the sixth reference mentioned above). Herein, the applicant analyzes this problem more closely and proposes an adaptive algorithm A2 as an alternative plane for solving this problem.

The inter-cell unfairness is defined as the significant imbalance of admission thresholds or reserved bandwidths among cells. When the inter-cell unfairness problem occurs, $P_d$'s of some cells are not kept below $P_{QoS}$ even with extremely low T's, while $P_d$'s of other cells are kept below $P_{QoS}$ even with high T's. This situation is also unfair to those cells with extremely low T's because almost all new calls are blocked in these cells.

The fundamental reason for this unfairness problem is that a cell can be overloaded both by (i) new calls and (ii) incoming handoffs calls. (i) is related to T of the current cell and (ii) is related to T's of adjacent cells. In the description below, it will shown that admission control schemes that consider only (i) can give rise to the unfairness problem. The following assumptions are used to analyze this.

1) A single class of traffic.
2) The arrival process of new calls is Poisson process with rate $\lambda n$.
3) The call duration is exponentially distributed with mean $1/\mu$.
4) The unencumbered cell residence time (i.e., cell residence time for an infinite duration call) is exponentially distributed with mean $1/\gamma$.
5) The capacity of each cell is C.

Under these assumptions, the probability distribution function of cell residence time i.e., the probability that a mobile will either handoff or complete in the residing cell within time $\tau$) is $$HC(\tau)=1-e^{-(\mu+\gamma)\tau} \qquad (6)$$

For such a discussion, see the paper, P. Ramanathan, K. M. Sivalingam, P. Agrawal and S. Kishore, *"Dynamic Resource Allocation Schemes During Handoff for Mobile Multimedia Wireless Networks,"* IEEE Journal on Selected Areas in Communications, 17(7), July 1999.

Further, the probability that a mobile will handoff within time $\tau$ is $$H(\tau) = \frac{\gamma}{\mu+\gamma}(1 - e^{-(\mu+\gamma)\tau}) \qquad (7)$$

Let $P_{H_{j\rightarrow i}}$ be the probability that a mobile will handoff from an adjacent cell j into a cell i given a handoff occurs, and let $M_j(t)$ be the number of mobiles in an adjacent cell j at time t. Then, the instantaneous handoff arrival rate $\lambda_h(t)$ in cell i at time t is $$\lambda_h(t) = \lim_{\tau\to 0}\frac{\sum_{j\in A_i}H(\tau)M_j(t)P_{H_{j\rightarrow i}}}{\tau} = \sum_{j\in A_i}\gamma M_j(t)P_{H_{j\rightarrow i}} \qquad (8)$$

Here, let us approximate $M_j(t)$ by its limit when t tends to the infinity $$\left(i.e., M_j = \lim_{t\to\infty}M_j(t)\right).$$

Then, $$\lambda_h = \lim_{t\to\infty}\lambda_h(t) = \sum_{j\in A_i}\gamma M_j P_{H_{j\rightarrow i}} \qquad (9)$$

By approximating the handoff call arrival by a Poisson process, it is possible to model the number of calls in cell i by a continuous time Markov chain. Then, it is straightforward to derive the dropping probability when the admission threshold is T $$P_d(T) = \frac{a^T b^{C-T}}{C!}P_0 \qquad (10)$$

where $\alpha=(\lambda_n+\lambda_h)/(\mu+\gamma)$, $b+\lambda_h/(\mu+\gamma)$ and $$P_0 = \left[\sum_{k=0}^{T}\frac{a^k}{k!} + \sum_{k=T+1}^{C}\frac{a^T b^{k-T}}{k!}\right]^{-1}.$$

If T is set at 0, $P_d$ is lower-bounded as shown in Equation (11) below.

$$P_d(0) = \frac{b^C}{C!}\left[\sum_{k=0}^{C}\frac{b^k}{k!}\right]^{-1} > \frac{b^C}{C!}\left[\sum_{k=0}^{\infty}\frac{b^k}{k!}\right]^{-1} = \frac{b^C}{C!}e^{-b} \qquad (11)$$

To evaluate the effects of the utilization of adjacent cells and user mobility on this lower-bound, it is assumed that a mobile handoffs into adjacent cells with an equal probability. Then, $\lambda_h=\gamma\overline{M}A_i$ in Equation (9) where $\overline{M}A_i$ is the average number of mobiles in the adjacent cells of cell i. Let $\overline{U}A_i$ be the average utilization of adjacent cells of cell i (i.e., $\overline{U}A_i=\overline{M}A_i/C$). Also, let $\rho=b/C$ and $H=\gamma/\mu$(H can be interpreted as the average number of handoffs). Then, Equation (12) is obtained.

$$\rho = b/C = \frac{H\overline{U}_{A_i}}{H+1} \qquad (12)$$

The parameter $\rho$ is related to both the user mobility and utilization of adjacent cells. The larger H is (i.e., high mobility) and the closer $\overline{U}_{Ai}$ approaches to 1 (i.e., overloaded adjacent cells), the closer p approaches to 1.

Figure 13:
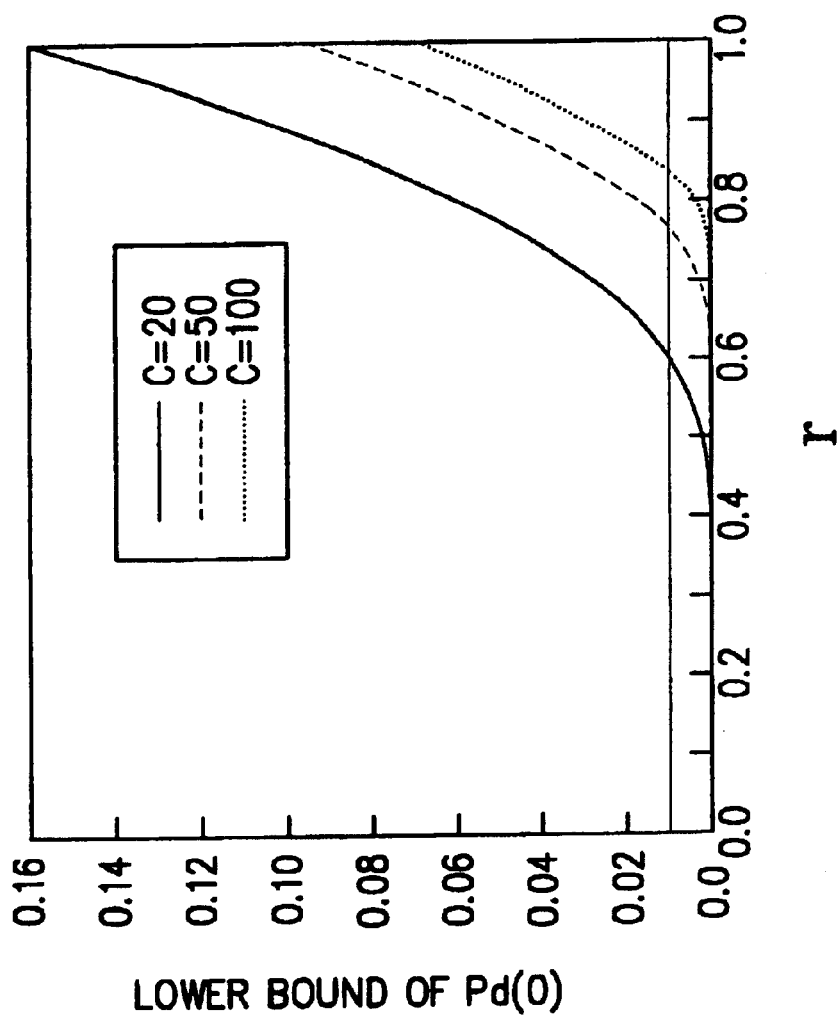
FIG. 13 is a diagram for explaining the inter-cell unfairness problem considered in the present invention, wherein a relationship between the lowest limit of a handoff dropping probability $P_d(0)$ and ρ is illustrated.

FIG. 13 shows the lower-bound of $P_d(0)$ versus a parameter ρ. Referring to FIG. 13, when ρ is over a certain value, the lower-bound of $P_d(0)$ is over a target value, say 0.01. In other words, no matter how the BS of cell i decreases its threshold, it cannot provide a probabilistic QoS guarantee.

An example scenario for the unfairness problem will be described below. Assume high mobility and uniform heavy loading conditions for all cells. Also, assume that the initial state is at the equilibrium state where the threshold values of all cells are similar while keeping $P_d$ below a target value. In this situation, multiple handoff drops could occur in a cell, say cell i, for some reason (that handoffs could be bursty). Then, the BS of cell i will start to decrease T(i). However, the effect of the decreased threshold is not shown immediately. Until then, incoming handoffs will be continuously dropped, triggering further decrease of T(i). During this time, newly requested calls in cell i will be blocked because of the overloaded cell condition and decreased threshold (i.e., $C_a(i)>T(i)$). Thus, handoffs from cell i to cells $A_i$ decrease, contributing to less handoff drops in cells $A_i$. This effect can be remarkable in one-dimensional cellular structure where a cell is adjacent to only two other cells.

Some BSs in cells Ai may increase T's, thus admitting more new calls. Some of these newly admitted calls will soon handoff into cell i, causing more handoff drops in cell i and triggering further decrease of T(i). T(i) can be decreased down to 0. But the system still may not keep $P_d$ below a target value. However, in some cells of $A_i$, due to the decreased incoming W handoffs, the $P_d$'s may be below the target value even with rather high thresholds. This shows how the inter-cell unfairness problem occurs.

Enhanced Admission Control

Two alternatives are possible to solve the unfairness problem. One is to modify the admission test and the other is to modify the adaptive control algorithm. Both consider the current cell and the adjacent cells together. Below, a description will be made of an enhance admission test T2 obtained by modifying the admission test T1, and an enhanced adaptive control algorithm A2 obtained by modifying the adaptive control algorithm A1.

A. Enhanced Admission Test (T2)

The admission test T1 is modified in three steps as follows and named as T2.

Step 1. Check if $C_a(i)+B_{new} \leq T(i)$.

Step 2. For all $j \in A_i$, check if $C_a(j) \leq T(j)$.

Step 3. If both are true, the new call is admitted.

Figure 6:
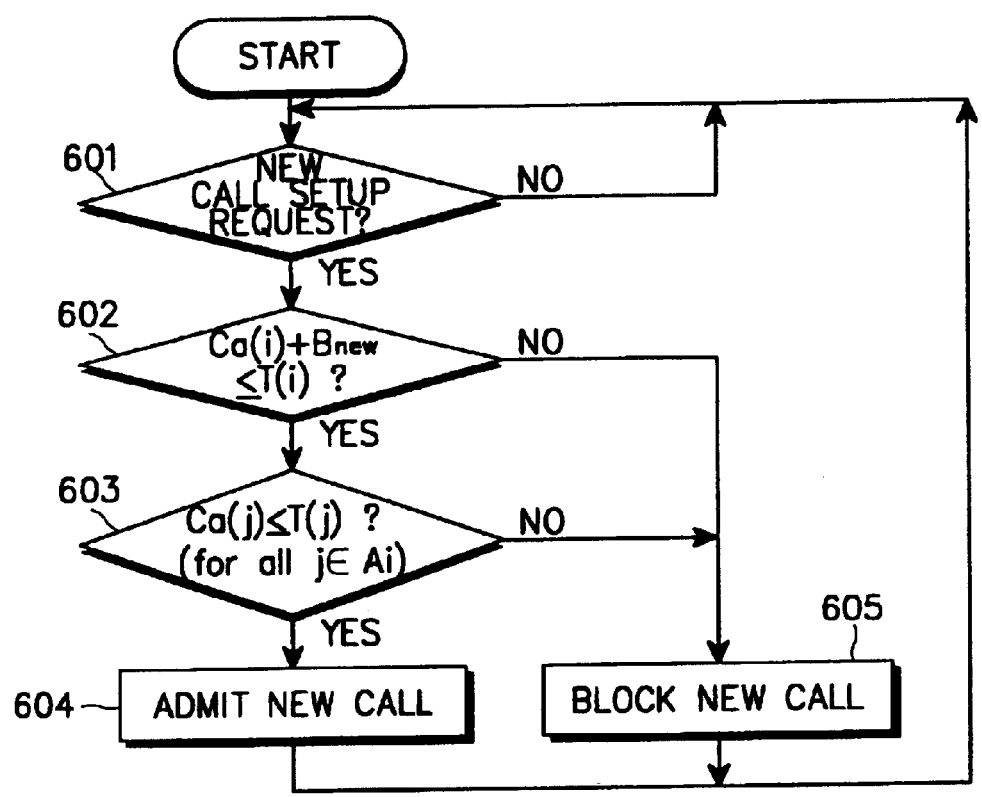
FIG. 6 is a flow chart illustrating a procedure for performing a call admission test according to an embodiment T2 of the present invention.

FIG. 6 illustrates a procedure for performing the call admission test according to an embodiment T2 of the present invention. This procedure can solve the inter-cell unfairness problem by modifying the call admission test shown in FIG. 2. This procedure is applied to the case where a new handoff call occurs.

Referring to FIG. 6, the base station controller determines in step 601 whether a new call setup request has occurred. If it is determined that a new call setup request has occurred, the base station controller performs a decision operation in accordance with Equation (1) in step 602. If it is determined in step 602 that the allocated bandwidth plus the bandwidth of the call is less than or equal to the admission threshold, the base station controller checks in step 603 whether $C_a(J) \leq (j)$ for all $j \in A_i$. That is, the base station controller determines in step 602 whether one cell is overloaded, and if not so, the base station controller additionally determines whether any of the adjacent cells is overloaded. If it is determined that not only a new call setup-requested cell but also the adjacent cells are not overloaded, the base station controller admits the new call in step 604.

Otherwise, if it is determined in step 602 that the allocated bandwidth plus the bandwidth of the call is larger than the admission threshold, i.e., when the new call setup-requested cell is overloaded and the adjacent cells are also overloaded in step 603, the base station controller blocks the new call in step 605.

In this admission test T2, if any of the adjacent cells is overloaded, the current cell blocks a new call request even if it is not overloaded. In other words, when a cell is overloaded, new call requests are blocked in all adjacent cells. By doing so, the continuous handoffs into the overloaded cell can be reduced.

B. Enhanced Adaptive Control Algorithm (A2)

Figure 7:
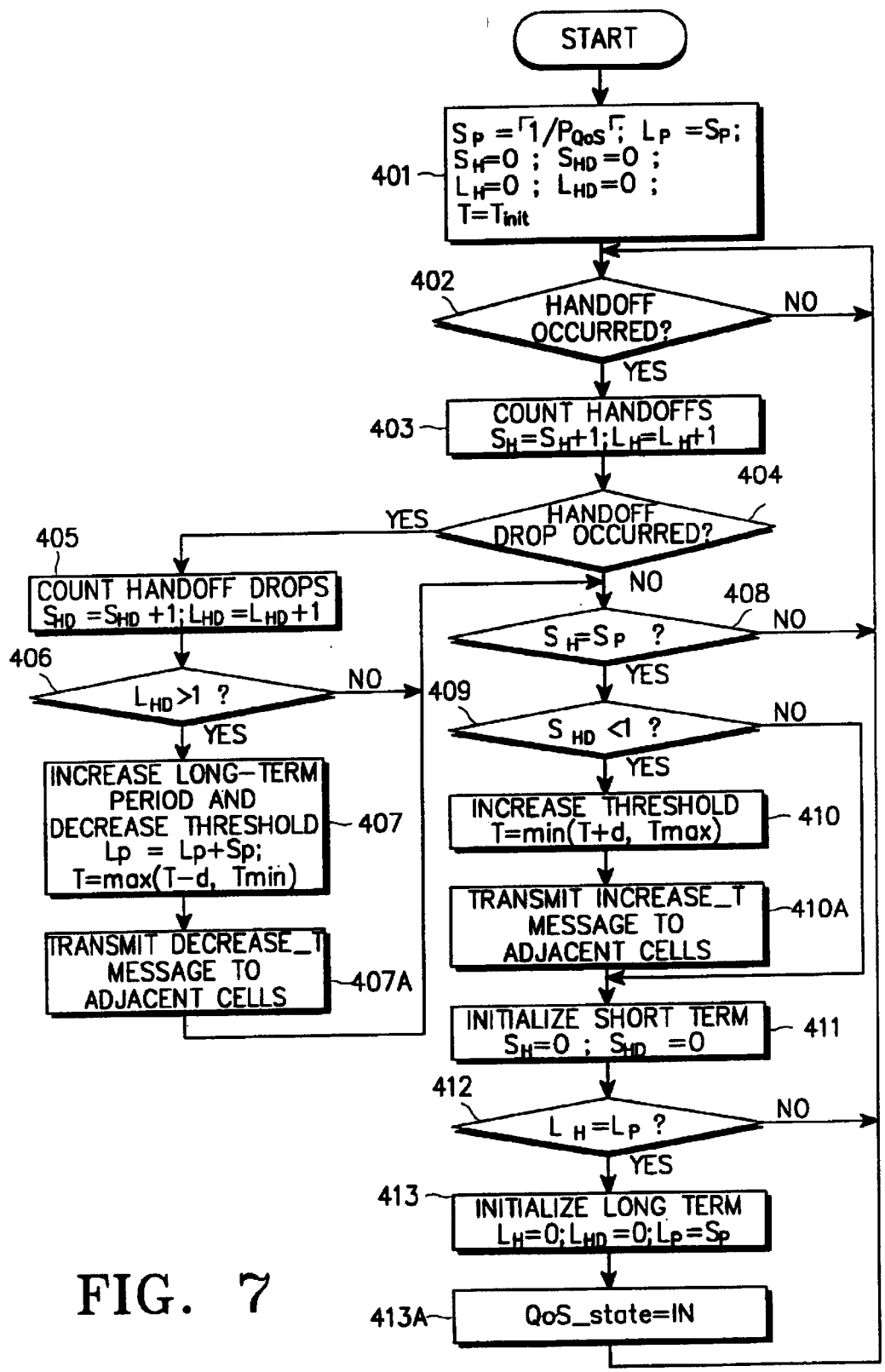
FIGS. 7 and 8 are flow charts illustrating a procedure of an adaptive control algorithm for adjusting an admission threshold according to an embodiment A2 of the present invention.
Figure 8:
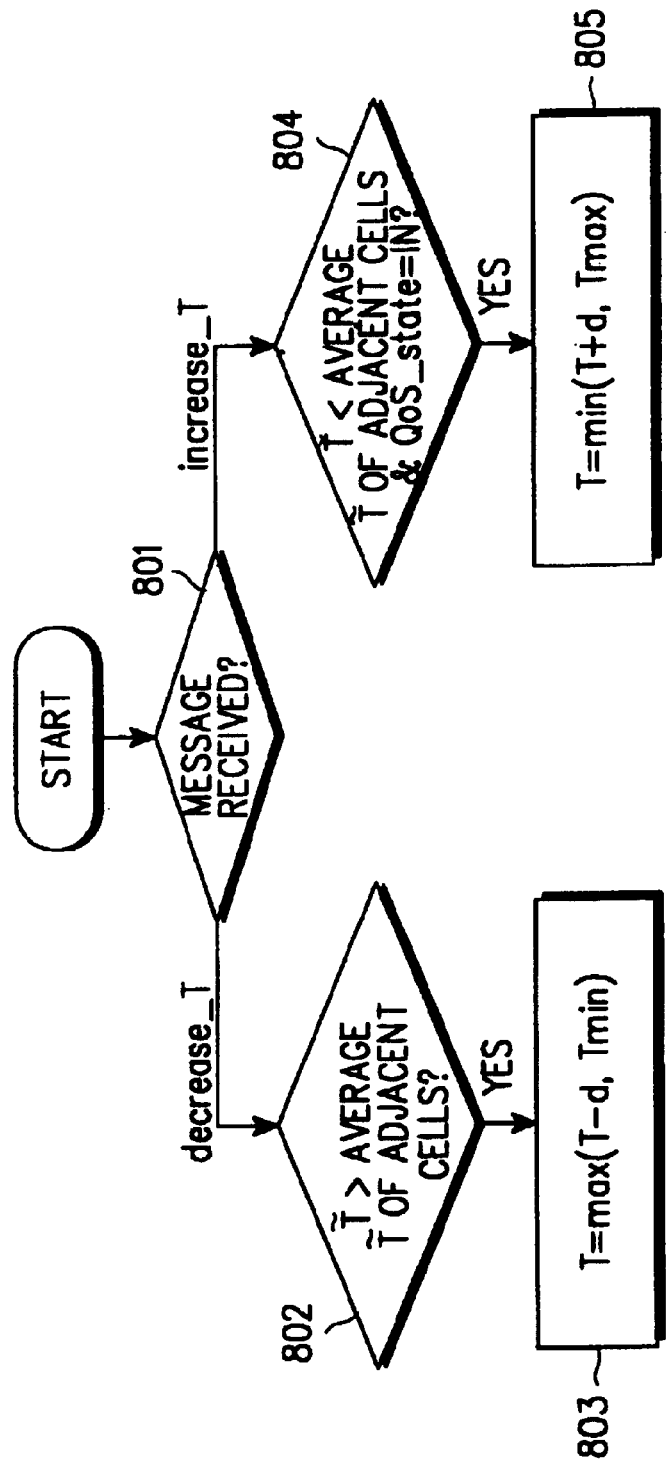

Enhanced adaptive control algorithm A2 to solve the unfairness problem is to modify the algorithm A1. As described above, if a cell is overloaded and multiple handoff drops occur, it is not sufficient to decrease only the threshold of the current cell. The thresholds of the adjacent cells must also be decreased so that incoming handoffs are reduced. In order to compensate for the threshold decrease and maximize the utilization, the thresholds of the adjacent cells should be properly increased when the threshold of the current cell is increased. That is, the basic idea is to decrease or increase the thresholds of adjacent cells along with that of the current cell. The enhanced algorithm named A2 is shown in Table 3 below, and the corresponding procedure is illustrated in FIGS. 7 and 8. Table 3 shows a modification of the algorithm A1 shown in Table 2, and FIGS. 7 and 8 show a modification of the procedure shown in FIG. 4. In Table 3, '*' indicates the lines newly inserted in the algorithm of Table 2.

TABLE 3

| | |
|---|---|
| 3. | WHILE (time increases) { |
| * |    IF (receive decrease_T message) THEN |
| * |       IF ( $\tilde{T}$ > avg. $\tilde{T}$ of adjacent cells) THEN |
| * |          T = max(T − d, $T_{min}$); |
| * |    IF (receive increase_T message) THEN |
| * |       IF ($\tilde{T}$ < avg. $\tilde{T}$ of adjacent cells and QoS state==IN) THEN |
| * |          T = $_{min}$(T + d; $T_{max}$); |
| . | . |
| 8. |    IF ($L_{HD}$ > 1) THEN { |
| 9. |       $L_P$ = $L_P$ + $S_P$ ; |
| 10. |       T = $_{max}$(T − d, $T_{min}$); |
| * |       send decrease_T messages to the BSs of adjacent cells; |
| * |       QoS_state=OUT; |
| 11. |    } |
| . | . |
| 14. |    IF ($S_{HD}$ < 1) THEN { |
| 15. |       T = $_{min}$(T + d; $T_{max}$); |
| * |       send increase_T messages to the BSs of adjacent cells;} |
| 16. |    $S_H$ = 0; $S_{HD}$ = 0; |
| 17. |    IF ($L_H$ == $L_P$) THEN { |
| 18. |       $L_H$ = 0; $L_{HD}$ = 0; $L_P$ = $S_P$; |
| * |       QoS_state=IN; |
| 19. | } |

FIG. 7 illustrates a procedure of the enhanced adaptive control algorithm for adjusting an admission threshold according to an embodiment A2 of the present invention.

The procedure of FIG. 7 is based on the algorithm A2 shown in Table 3, and compared 20 with the procedure of FIG. 4. It is noted that the procedure of FIG. 7 further includes steps 407A, 410A and 413A, in addition to the procedure of FIG. 4. Because such steps are additionally included, the adjacent base stations perform the procedure show in FIG. 8. Therefore, the detailed description of the procedure will be avoided and only the newly added steps will be described.

Referring to Table 3 and FIGS. 7 and 8, the base station of cell i decreases its threshold in step 407, and transmits a decrease_T message to the base stations of the adjacent cells $A_i$ in step 407A. Upon receipt of the message in step 801 of FIG. 8, the base station of a cell j (j∈$A_i$) decreases the threshold T in step 803, if it is determined in step 802 that the normalized threshold (i.e., the threshold divided by cell capacity) is higher than the average normalized threshold of the adjacent cells. Thus, the thresholds of some adjacent cells that "appear" to have higher thresholds are decreased.

Likewise, the base station of cell i increases T in step 410 of FIG. 7, and transmits an increase_T message to the base stations of cells $A_i$ in step 410A. Upon receipt of the increase_T message in step 801 of FIG. 8, the base station of an adjacent cell j (j∈$A_i$) increases T in step 805, if it is determined in step 804 that the normalized threshold is lower than the average normalized threshold of the adjacent cells. Here, "QoS_state=IN" indicates that the long-term QoS is satisfied.

Adaptive Admission Control Apparatus

In the following description, an adaptive control apparatus for adjusting the admission threshold according to an embodiment of the present invention processes a call requested to a certain cell i out of a plurality of cells in a wireless network.

Figure 9:
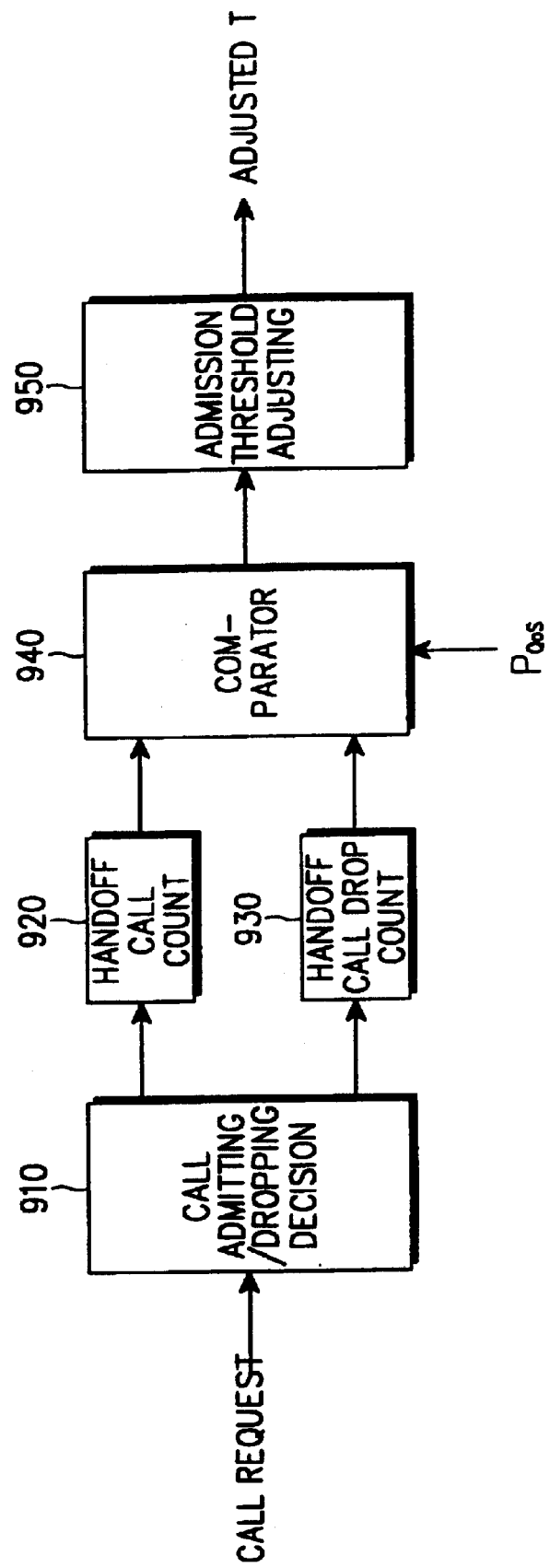
FIG. 9 is a block diagram illustrating an adaptive control apparatus for adjusting an admission threshold according to an embodiment A1 of the present invention.

FIG. 9 illustrates a structure of an adaptive control apparatus for adjusting the admission threshold according to an embodiment A1 of the present invention.

Referring to FIG. 9, the adaptive control apparatus includes a handoff admitting/dropping decision block 910, a handoff count block 920, a handoff drop count block 930, a comparator 940 and an admission threshold adjusting block 950. The handoff admitting/dropping decision block 910 is an element for performing the procedures shown in FIG. 3. The other elements perform the procedure shown in FIG. 4.

The handoff admitting/dropping decision block 910 compares, upon receipt of a handoff call request, the sum of the allocated bandwidth of cell i and the bandwidth for the requested handoff call with the capacity of the cell i, and determines whether to admit or block the requested handoff call. That is, in accordance with the procedure of FIG. 3, the handoff admitting/dropping decision block 910 decides to admit the requested handoff call when the sum is less than or equal to the capacity of the cell i, and decides to drop the requested handoff call when the sum is larger than the capability of the cell i.

The handoff count block 920 counts the number of handoff calls requested for a first term (i.e., short term). The handoff drop count block 930 counts the number of handoff calls dropped for the first term. The handoff count block 920 and the handoff drop count block 930 serve as a monitoring block for monitoring the number of the handoff calls requested and dropped for the first term.

The comparator 940 compares the monitoring result by the monitoring block with a target handoff dropping probability $P_{QoS}$. The comparison result can either satisfy or not satisfy the target handoff dropping probability.

The admission threshold adjusting block 950 adjusts the admission threshold T according to the comparison result by the comparator 940. The admission threshold adjusting block 950 decreases the admission threshold, when the comparison result by the comparator 940 does not satisfy the target handoff dropping probability.

The monitoring block monitors the first term while changing a value of a second term (or long term) until the target handoff dropping probability is satisfied in the second term. The second term is set to be longer than or equal to the first term, including the first term. As the admission threshold decreases, the value of the second term increases.

The monitoring block performs the monitoring operation until the target handoff dropping probability is satisfied. Thus, the comparator 940 and the admission threshold adjusting block 950 perform the corresponding comparison operation and admission threshold adjusting operation according to the monitoring result.

For example, in the case where the target handoff dropping probability is 0.01, i.e., one of 100 requested handoff calls is dropped, if the monitoring result by the monitoring block indicates that two of the 100 requested handoff calls are blocked, the target handoff dropping probability is not satisfied. In this case, the admission threshold adjusting block 950 decreases the admission threshold T, increases to 200 the value of the second term which was initially set to be equal to the first term (for monitoring the 100 requested handoff calls), and then determines whether two of 200 requested handoff calls are dropped satisfying the target handoff dropping probability. When the target handoff dropping probability is satisfied, the admission threshold adjusting block 950 monitors again the handoff drops occurring in the first term and adaptively decides the admission threshold according to the monitoring result.

Figure 10:
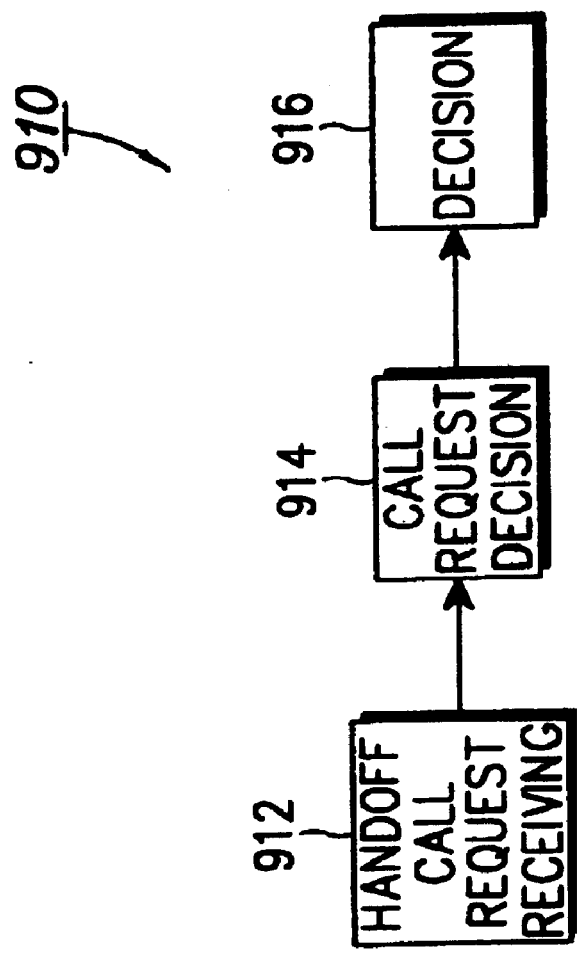
FIG. 10 is a detailed block diagram illustrating a structure of the handoff admitting/dropping decision block shown in FIG. 9.

FIG. 10 illustrates a detailed structure of the handoff admitting/dropping decision block 910 shown in FIG. 9.

Referring to FIG. 10, a handoff request receiving block 912 receives a handoff call request in the cell i. A cell resource decision block 914 determines, upon receipt of a handoff call request, whether there is a cell resource for admitting the requested handoff call, by comparing the sum of the allocated bandwidth $C_a(i)$ of the cell i and the bandwidth $B_{handoff}$ for the requested handoff call with the capacity C(i) of the cell i.

A decision block 916 decides to admit the requested handoff call to the cell i, when the sum is less than or equal to the capability C(i). Otherwise, when the sum is larger than the capability C(i), the decision block 916 decides to drop the requested handoff call to the cell i.

Figure 11:
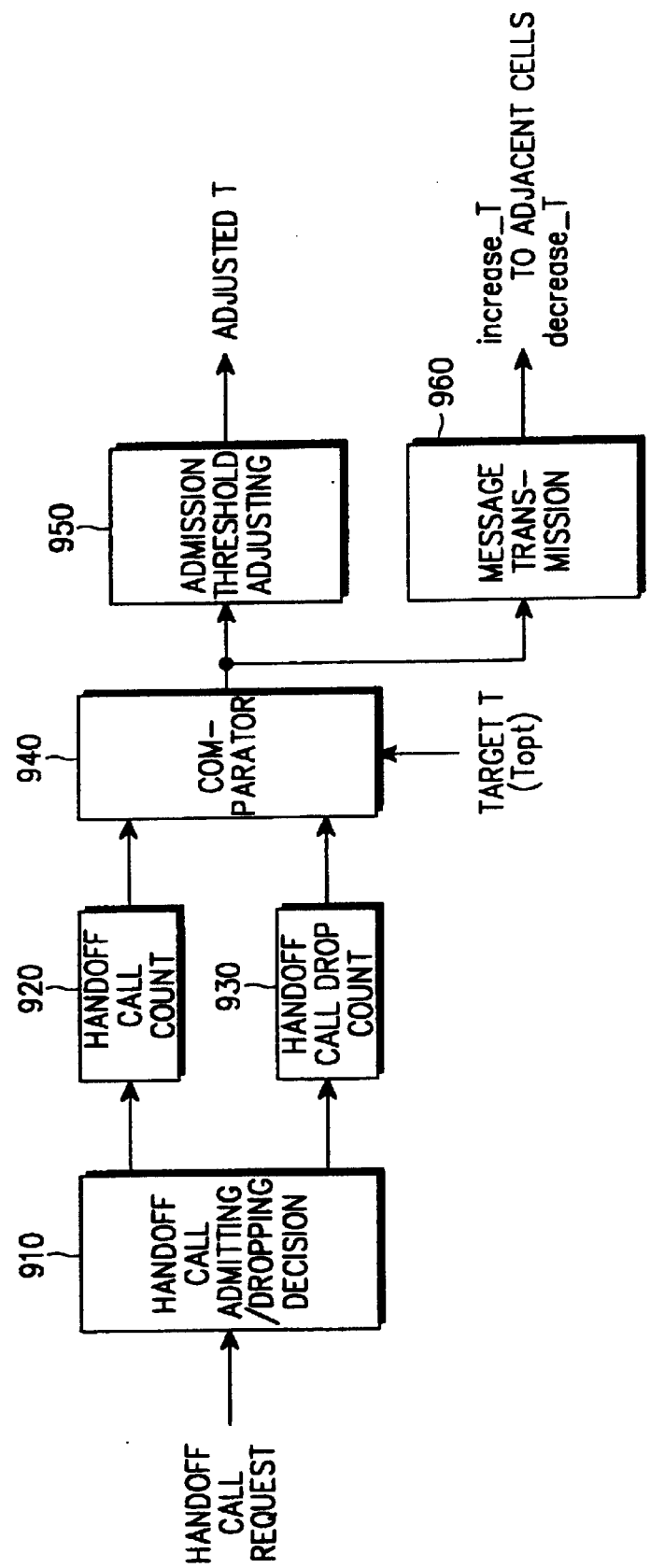
FIG. 11 is a block diagram illustrating an adaptive control apparatus for adjusting an admission threshold according to an embodiment A2 of the present invention.

FIG. 11 illustrates a structure of an adaptive control apparatus for adjusting the admission threshold according to an embodiment A2 of the present invention.

Referring to FIG. 11, the adaptive control apparatus further includes a message transmission block 960 in addition to the adaptive control apparatus of FIG. 9. The message transmission block 960 transmits, with intention of solving the inter-cell unfairness problem, a message for adjusting the admission threshold in the cells adjacent to the cell i in association with the admission threshold adjusted by the admission threshold adjusting block 950. The message being transmitted at that time includes the increase_T message for increasing the admission threshold, and the decrease_T message for decreasing the admission threshold. The message transmission block 960 performs an operation of steps 407A, 410A and 413A of FIG. 7.

The adaptive control apparatus including the message transmission block 960, performs the procedure of FIG. 7.

Figure 12:
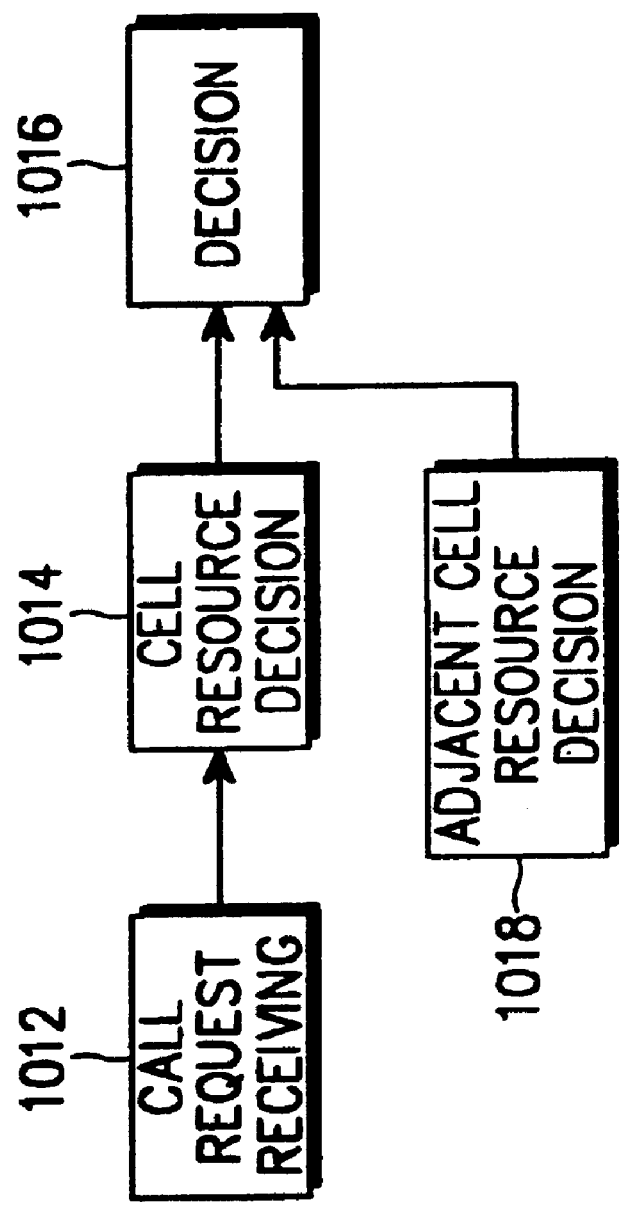
FIG. 12 is a detailed block diagram illustrating a structure of a call admitting(blocking decision block according to an embodiment T2 of the present invention.

FIG. 12 illustrates a detailed structure of a call admitting/blocking decision block according to an embodiment T2 of the present invention.

Referring to FIG. 12, the call admitting/blocking decision block includes a call request receiving block 1012, a cell resource decision block 1014, an adjacent cell resource decision block 1018, and a decision block 1016. This call admitting/blocking decision block further includes the adjacent cell resource decision block 1018 in addition to the handoff admitting/dropping decision block 910 of FIG. 10. The modified adaptive control apparatus solves the inter-cell unfairness problem.

The adjacent cell resource decision block 1018 determines whether at least one of the cells adjacent to the cell i is overloaded. Thus, the decision block 1016 decides to admit a call newly requested to the cell i, when the cells adjacent to the cell i are not all overloaded even if it is determined by the cell resource decision block 1014 that the sum of the allocated bandwidth $C_a(i)$ of the cell i and the bandwidth $B_{NEW}$ for the requested new call is less than or equal to the admission threshold T(i) of the cell i. The call admitting/blocking decision block including the adjacent cell resource decision block 1018 and the decision block 1016, performs the procedure shown in FIG. 6.

Comparative Performance Evaluation

This section evaluates the three proposed admission control schemes AC1, AC2 and AC3, and compares the best one among the three schemes with the existing adaptive schemes CS98 and OKS98. Here, "AC1" indicates a combination of T1 and A1, "AC2" a combination of T2 and A1, and "AC3" a combination of T1 and A2. First, a description will be made of the simulation environments and parameters.

A. Simulation Environments and Parameters

Figure 14:
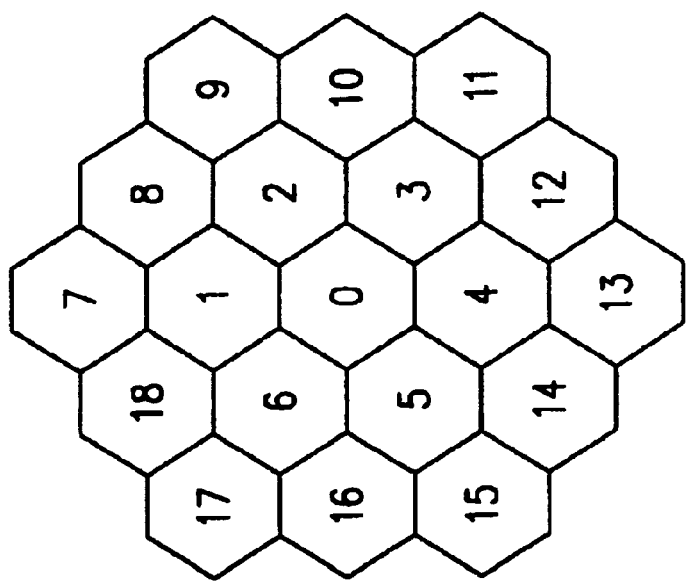
FIG. 14 is a diagram illustrating a topology of a wireless network considered to evaluate performances of the embodiments AC1, AC2 and AC3 of the present invention.

A two-dimensional cellular system with the topology of the wireless network, shown in FIG. 14, will be considered.

Referring to FIG. 14, each border cell (i.e., cells 7–18) is connected to the opposite border cell (e.g., cell 7 is connected to cell 13) to alleviate the finite size effect. The assumptions for the simulation study are as follows.

1) The arrival process of new call requests is Poisson process with rate λ (calls/s/cell), which is uniform to all cells unless stated otherwise.

2) A new call is either for voice (1 BU) or video (4 BU) with the probability of $F_1$ and $1-F_1$, respectively, wherein $F_1 \leq 1$.

3) The velocity of a mobile is randomly selected between $[V_{min}, V_{max}]$ (km/h) and the direction of a mobile is also randomly selected. Once determined, its values are fixed until the call completes.

4) The duration of a call is exponentially distributed with mean $\mu^{-1}$ (=120s).

5) The capacity of each cell is C (=100 BUs) and the cell's diameter is 1 km.

The other simulation parameters are: $T_{init}=T_{max}=100$ (BUs), $T_{min}=0$ (BU) and $P_{QoS}=0.01$. The offered load per cell, L, is calculated as follows.

$$L=(1 \cdot F_1 + 4 \cdot (1-F_1)) \cdot \lambda \cdot \mu^{-1}/C \quad (13)$$

In Equation (13), the numerator represents the average total bandwidth required to support all existing calls in a cell. A range of the offered load is from 0.7 to 3.0. Two cases of user mobility will be considered: high mobility with [80, 120] and low mobility with [40, 60].

B. Comparison of Three Proposed Schemes

Figure 15A:
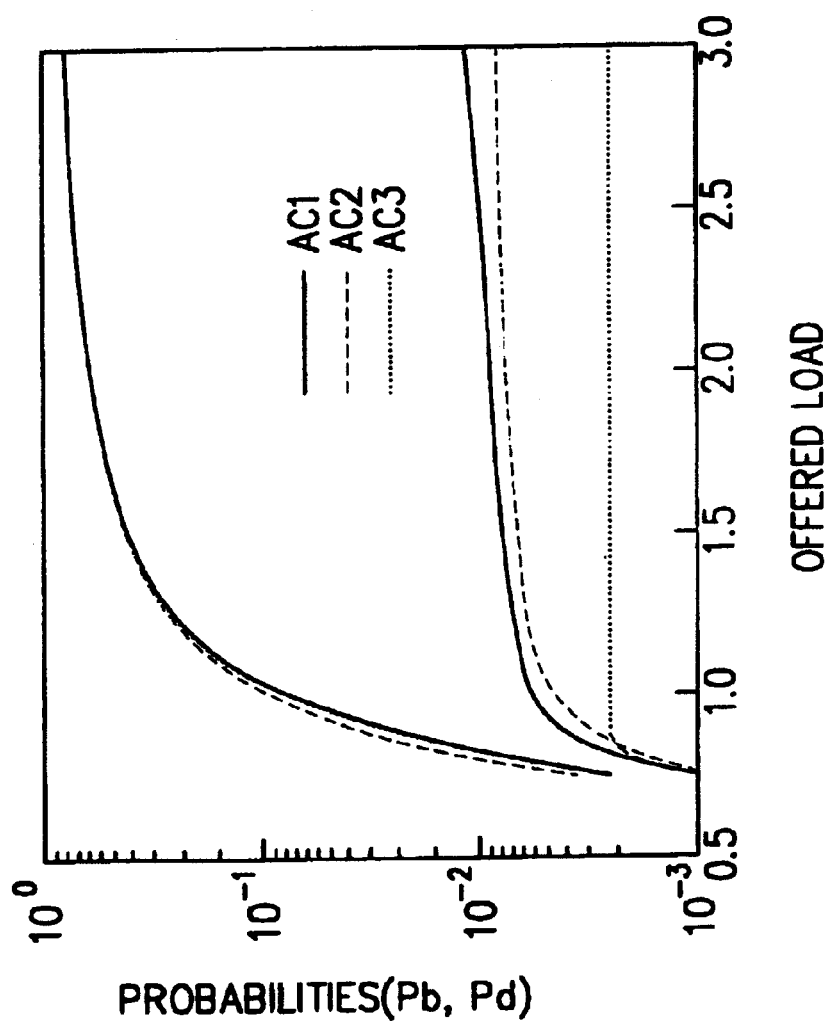
Figure 15B:
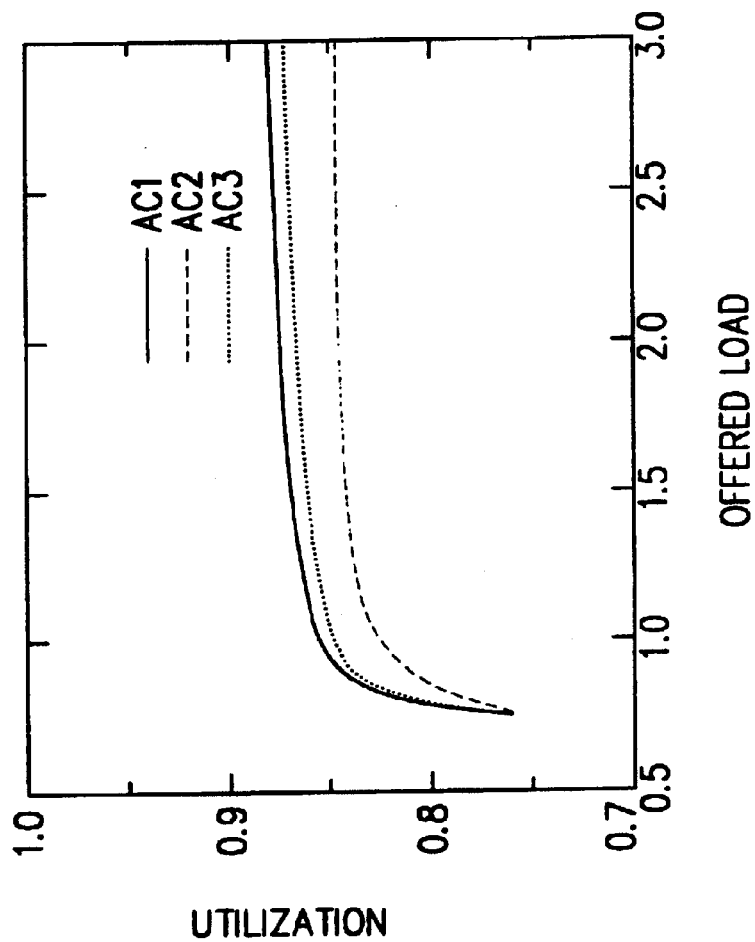

FIG. 15A and 15B illustrate the relationship between $P_b$ and $P_d$, and utilization as the offered load increases with high mobility and F1=1.0.

Before comparing the three schemes, AC1 will be focused. Although AC1 satisfies the QoS constraint at light offered load, it slightly overshoots $P_d$ at the offered load greater than 2.0. This small violation is probably negligible in almost all practical situations. However, when considering the inter-cell fairness, it cannot be ignored.

Figure 16A:
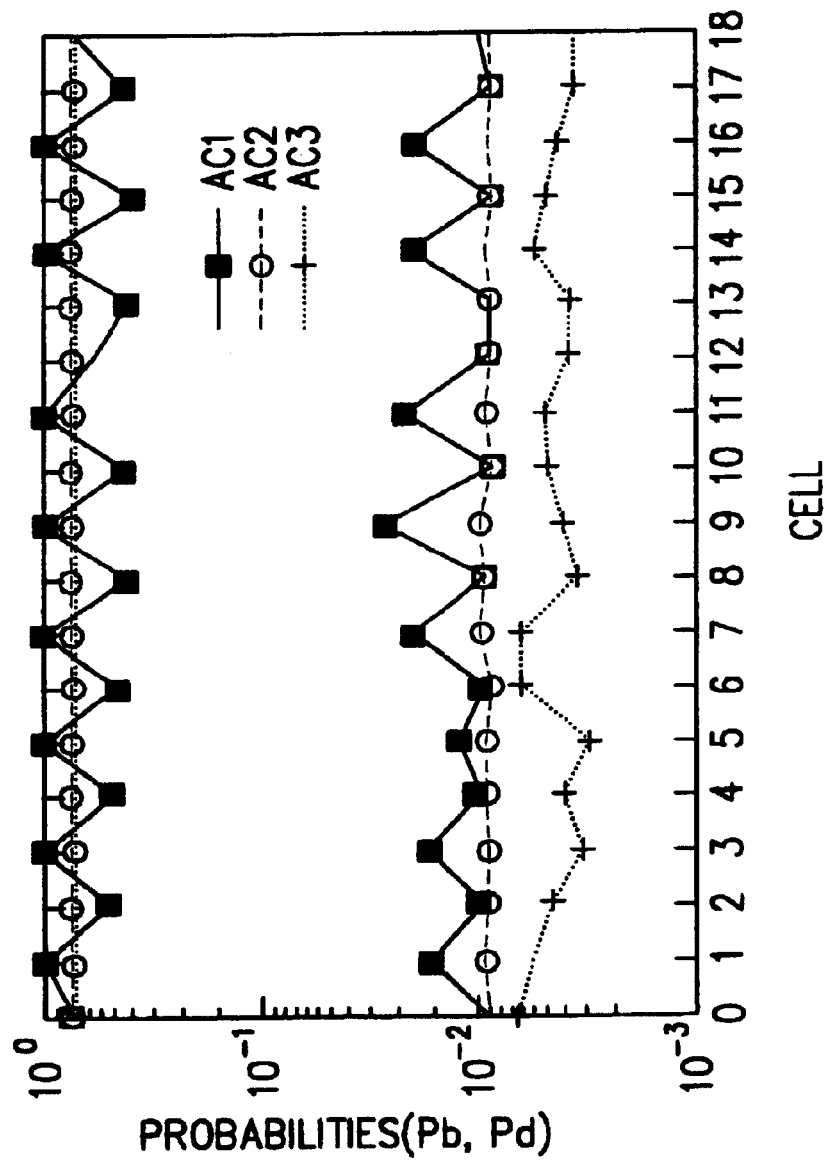
FIGS. 16A and 16B are diagrams illustrating status of each cell at the end of simulations with the offered load=3.0, with respect to the embodiments AC1, AC2 and AC3 of the present invention.
Figure 16B:
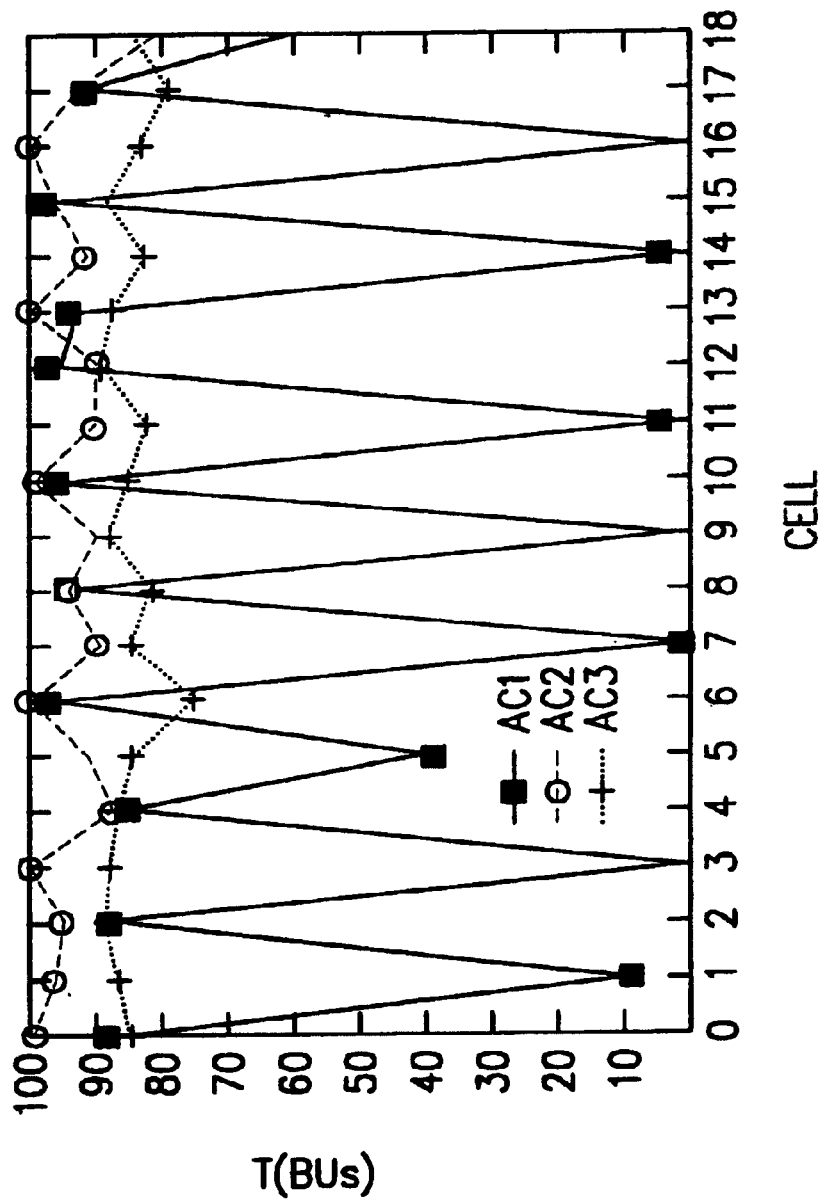

FIGS. 16A and 16B illustrate the status of each cell at the end of simulations with the offered load 3.0. Specifically, FIG. 16A illustrates the relationship between the cells and the probabilities $P_b$ and $P_d$, and FIG. 16B illustrates the relationship between the cells and the threshold T.

Referring to FIGS. 16A and 16B, in AC1, $P_b$, $P_d$ and T severely fluctuate. In some cells (such as cells 1,3,5, ... ), T's are extremely low and $P_b$'s are near 1.0. Hence, almost all new calls are blocked in these cells. However, $P_d$'s are not kept below 0.01. In the other cells, however, $P_d$'s are below 0.01 even at the high T's, raising the inter-cell unfairness problem. On the contrary, in AC2 and AC3, this unfairness problem does not show.

Now, turning back to FIGS. 15A and 15B, a comparison will be made between AC2 and AC3. First, in terms of $P_d$, both schemes meet the QoS constraint independent of the offered load, although the $P_d$ of AC3 is much lower than 0.01, which we will explain later. AC2 shows higher $P_b$ and lower utilization than AC3.

The detailed operations in a specific cell will be considered to further investigate the differences between the two schemes AC2 and AC3.

Figure 17A:
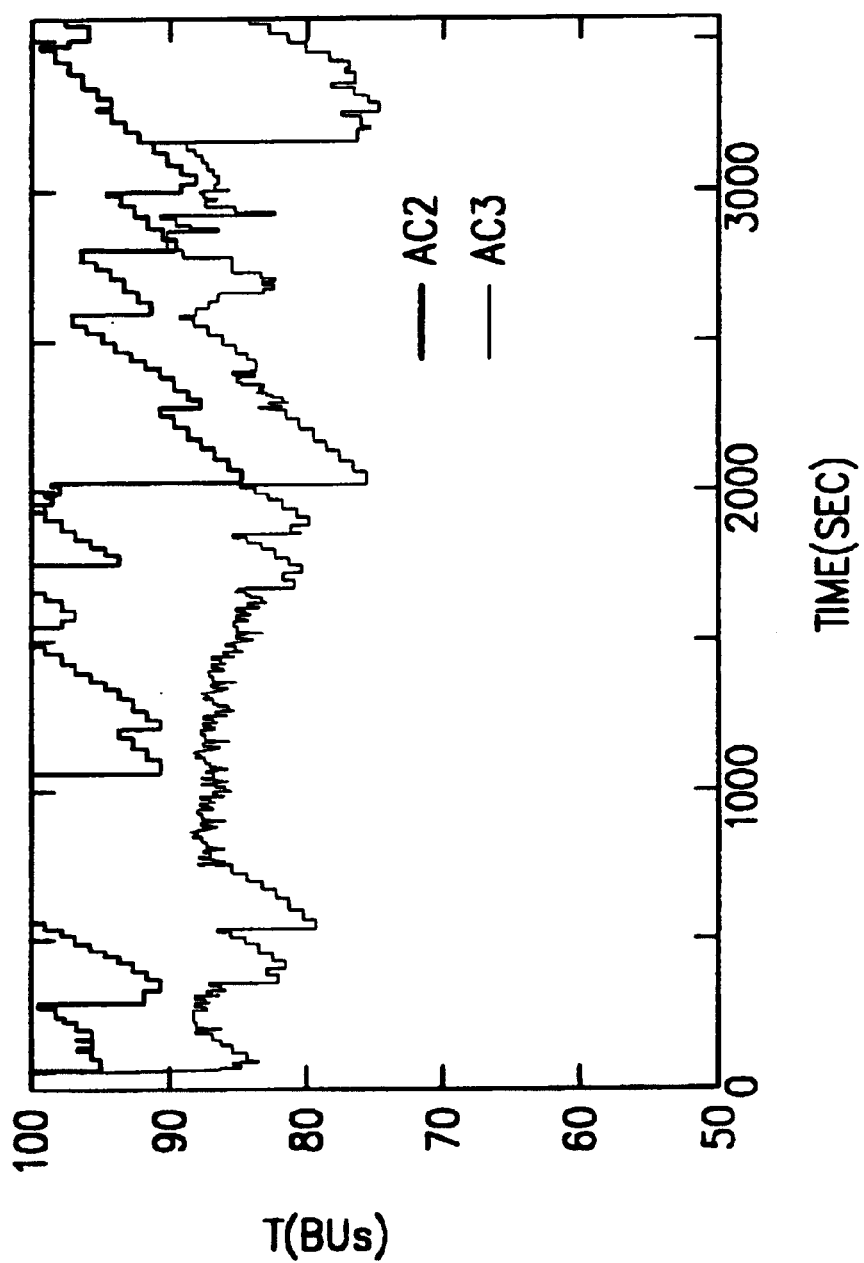
FIGS. 17A and 17B are diagrams illustrating a relationship between a threshold T and time average $P_d$ according to a time in a cell 0, with respect to the embodiments AC2 and AC3 of the present invention.
Figure 17B:
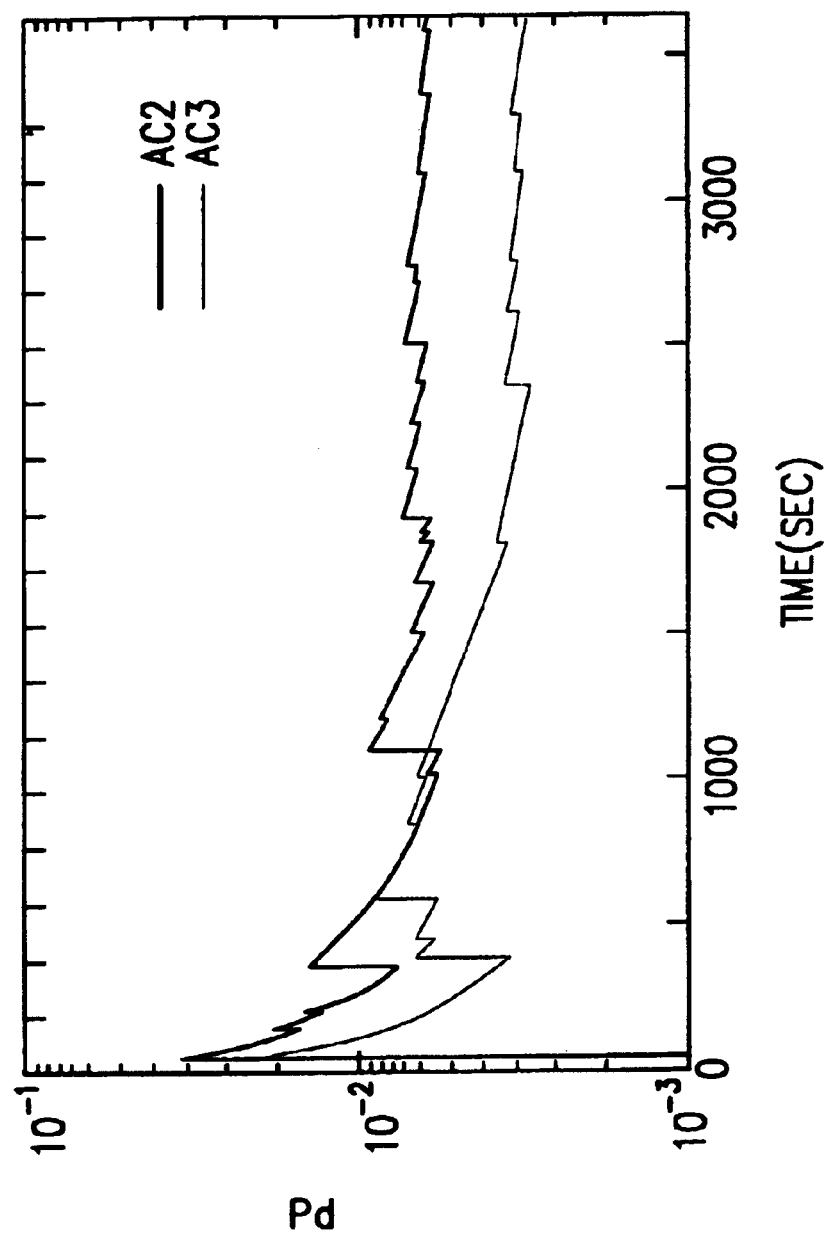

FIGS. 17A and 17B illustrate T and time average $P_d$ starting from the beginning of a simulation run for the offered load=3.0, high mobility and $F_1$=1.0 in cell 0.

Referring to FIG. 17A, the values of T are observed to go up and down as time passes. In AC2, a decrease of T by one corresponds to a handoff drop. Further, an increase of T by one means that no handoff drop occurred during a short-term period. In AC3, however, the same correspondence does not apply as in AC2 because T can be decreased or increased by the corresponding signaling messages from adjacent cells.

Referring to FIG. 17B, it is also observed that the decreasing moments of T exactly coincide with the increasing moments of $P_d$ as they should be. The $P_d$ near the starting point is over the target value 0.01 for both schemes AC2 and AC3, because the simulation starts with $T=T_{init}=100$ (BUs). However, as time goes on, $P_d$ eventually goes below 0.01 by the adaptiveness of T.

Another notable thing is that the T in AC2 is higher than that in AC3 in FIG. 17A. In AC2, high T of a cell does not exactly mean that more new calls will be admitted into that cell because the T's of adjacent cells are also considered in T2.

Figure 18A:
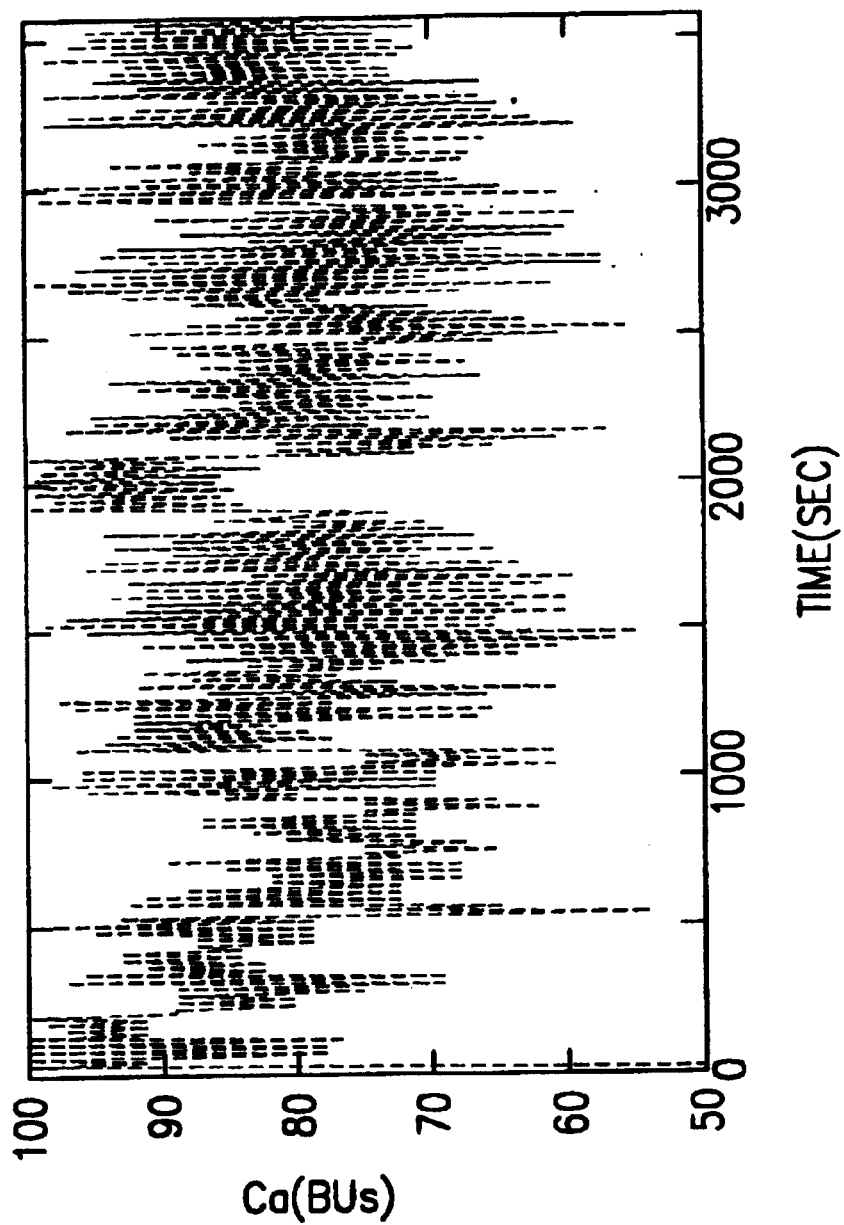
FIGS. 18A and 18B are diagrams illustrating a relationship between allocated bandwidths $C_a$ according to a time in a cell 0, with respect to the embodiments AC2 and AC3 of the present invention.
Figure 18B:
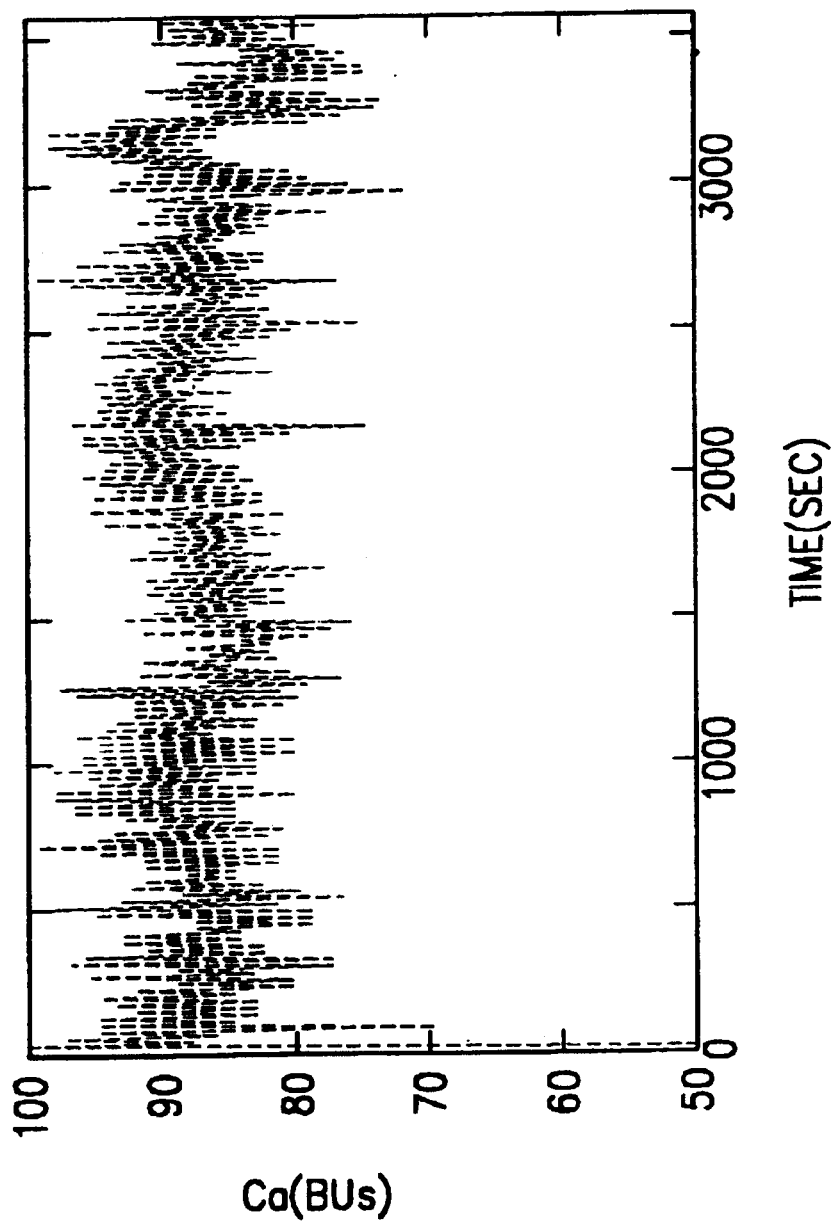

FIGS. 18A and 18B illustrate the relationship between the allocated bandwidths $C_a$ obtained from the same simulation run used for AC2 in FIGS. 17A and 17B.

Referring to FIG. 18A, it can be observed that $C_a$ is rather low even at high T. The severe fluctuation between under-utilization and over-utilization also reflects the characteristic of T2; that is, when any of the six adjacent cells is overloaded, new calls will be blocked irrespective of the T of the current cell. However, in AC3, only the current cell is considered when a new call is tested for admission. As a result, the T of the current cell directly affects the admission test.

Referring to FIG. 18B, it can be seen that $C_a$ in AC3 fluctuates less severely and the pattern of average values is similar to that of T in FIG. 17A. As a whole, these differences make a notable difference in terms of average utilization in FIG. 15B.

C. Comparison of AC3 with Existing Schemes

A comparison will be made between AC3, which performs best among the three proposed schemes, with existing adaptive admission control schemes CS98 and OKS98, respectively.

First, the applicant simulated CS98 and OKS98 with the offered load 3.0, high mobility and F1=1:0, to check the inter-cell fairness.

Figure 19A:
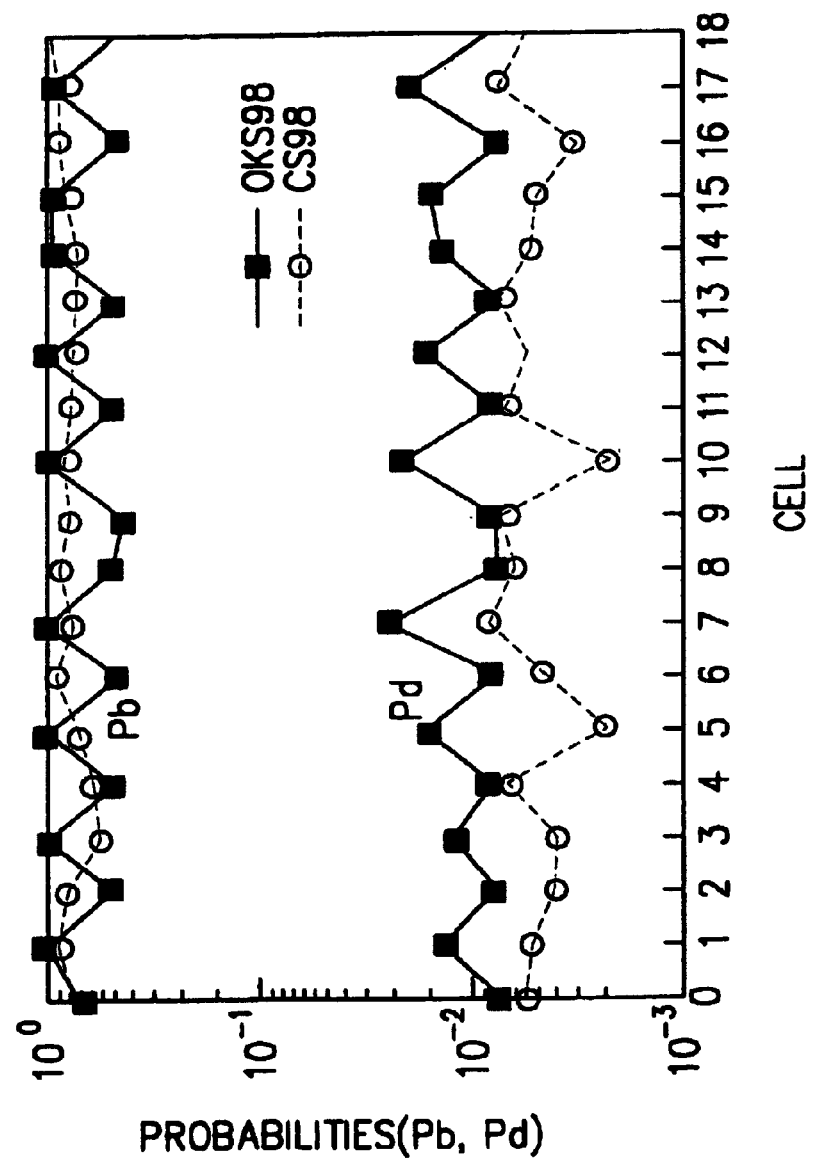
FIGS. 19A and 19B are diagrams illustrating a relationship between the probabilities $P_b$ and $P_d$ and a threshold T according to cells, with respect to the prior arts CS98 and OCK98.
Figure 19B:
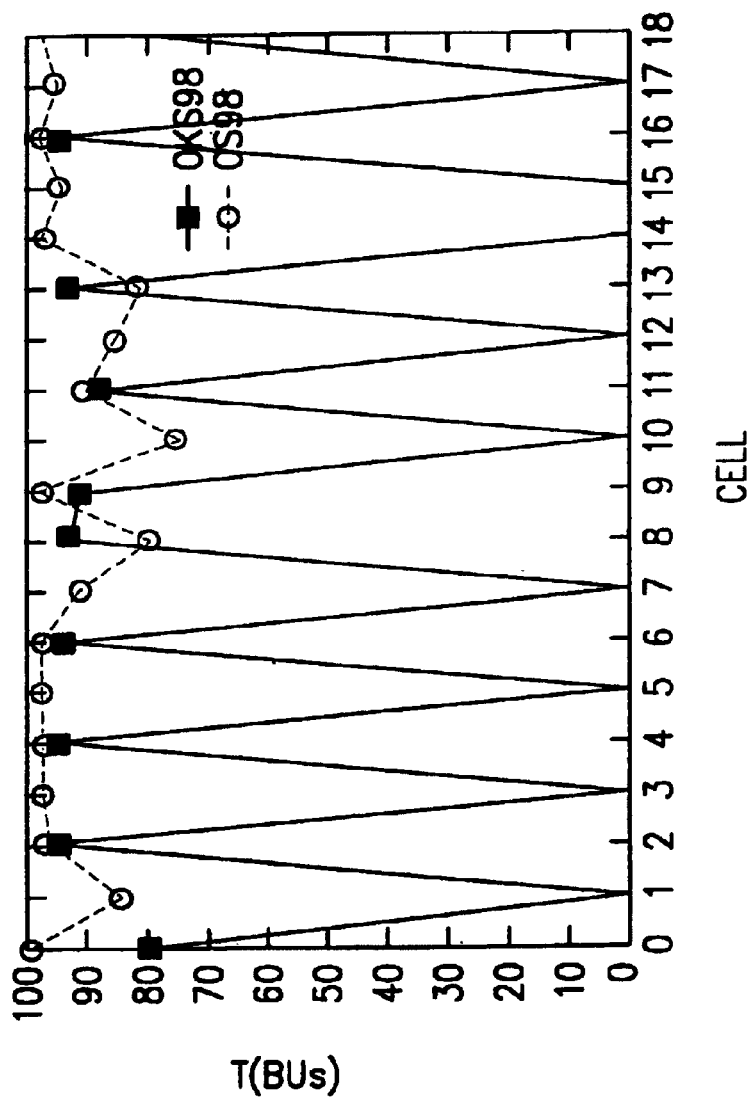

FIGS. 19A and 19B illustrate the relationship between the probabilities Pb and Pd, and the threshold T of each cell at the end of simulations for CS98 and OKS98.

Referring to FIGS. 19A and 19B, in OKS98, $P_b$, $P_d$ and T fluctuate severely like AC1, because OKS98 adjusts the reserved bandwidth R (=C–T) without considering the status of adjacent cells. However, CS98 solves this inter-cell unfairness problem because its admission test is similar to that of AC2. For this reason, OKS98 is omitted henceforth and consideration is focused on the comparison of AC3 and CS98.

Figure 20A:
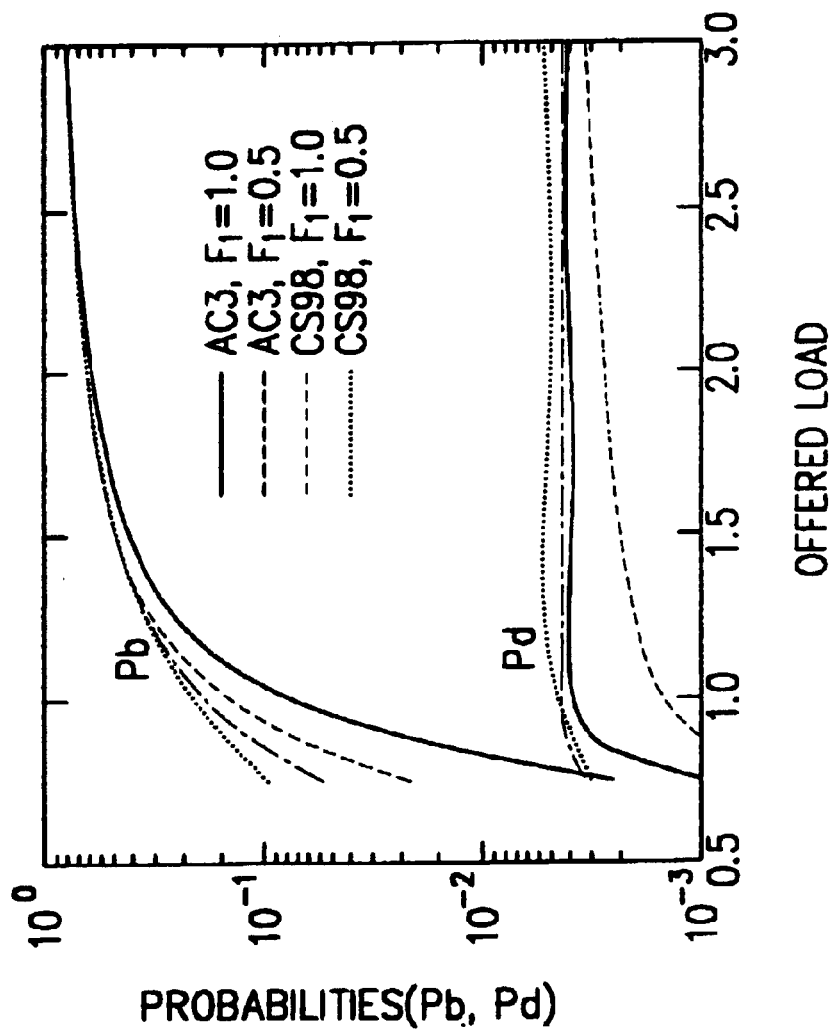
FIGS. 20A and 20B are diagrams illustrating a relationship between the probabilities $P_b$ and $P_d$ and utilization according to the offered load, with respect to the prior arts CS98 and OCK98.
Figure 20B:
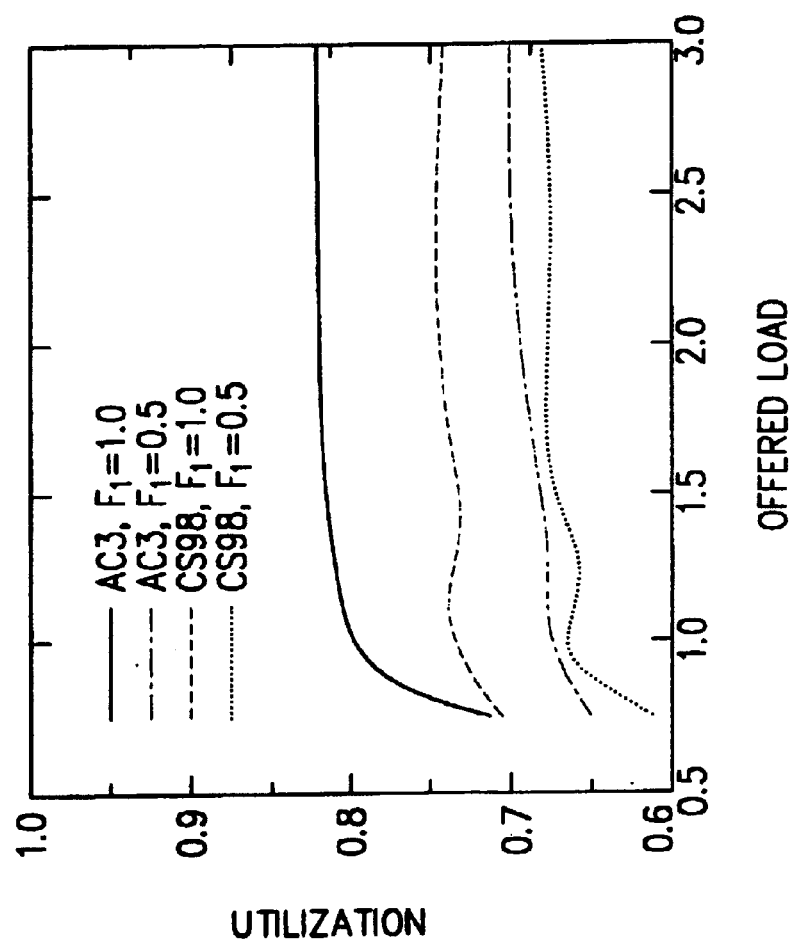

FIGS. 20A and 20B illustrate the relationship between $P_b$ and $P_d$, and the utilization versus the offered load with high mobility for $F_1$=1.0 and 0.5.

Referring to FIGS. 20A and 20B, both schemes of AC3 and CS98 satisfy the QoS constraint; $P_d$'s are kept below 0.01. In terms of $P_b$ and the utilization, both schemes show higher $P_b$ and lower utilization for $F_1$=0.5 than for $F_1$=1.0, since the more video calls exist, the more bandwidth is needed. It can also be seen that the utilization in AC3 is higher than that in CS98 for each value of $F_1$.

To illustrate the remarkable differences between CS98 and AC3 in terms of utilization, the applicant also investigated the detailed operations of CS98 in a specific cell.

Figure 21A:
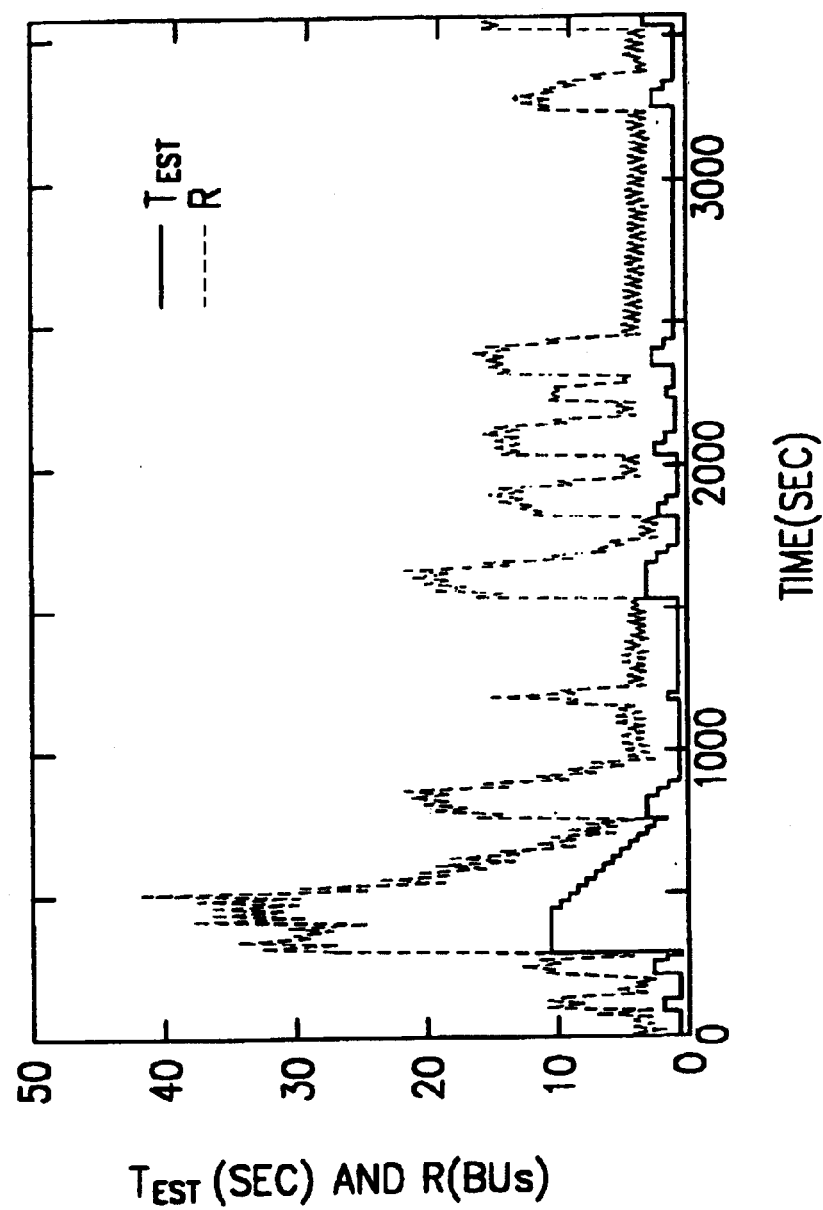
FIGS. 21A and 21B are diagrams illustrating a relationship between a time estimation window $T_{est}$ and a reserved bandwidth R, and an allocated bandwidth $C_a$ according to a time in a cell 0, with respect to the prior art CS98.
Figure 21B:
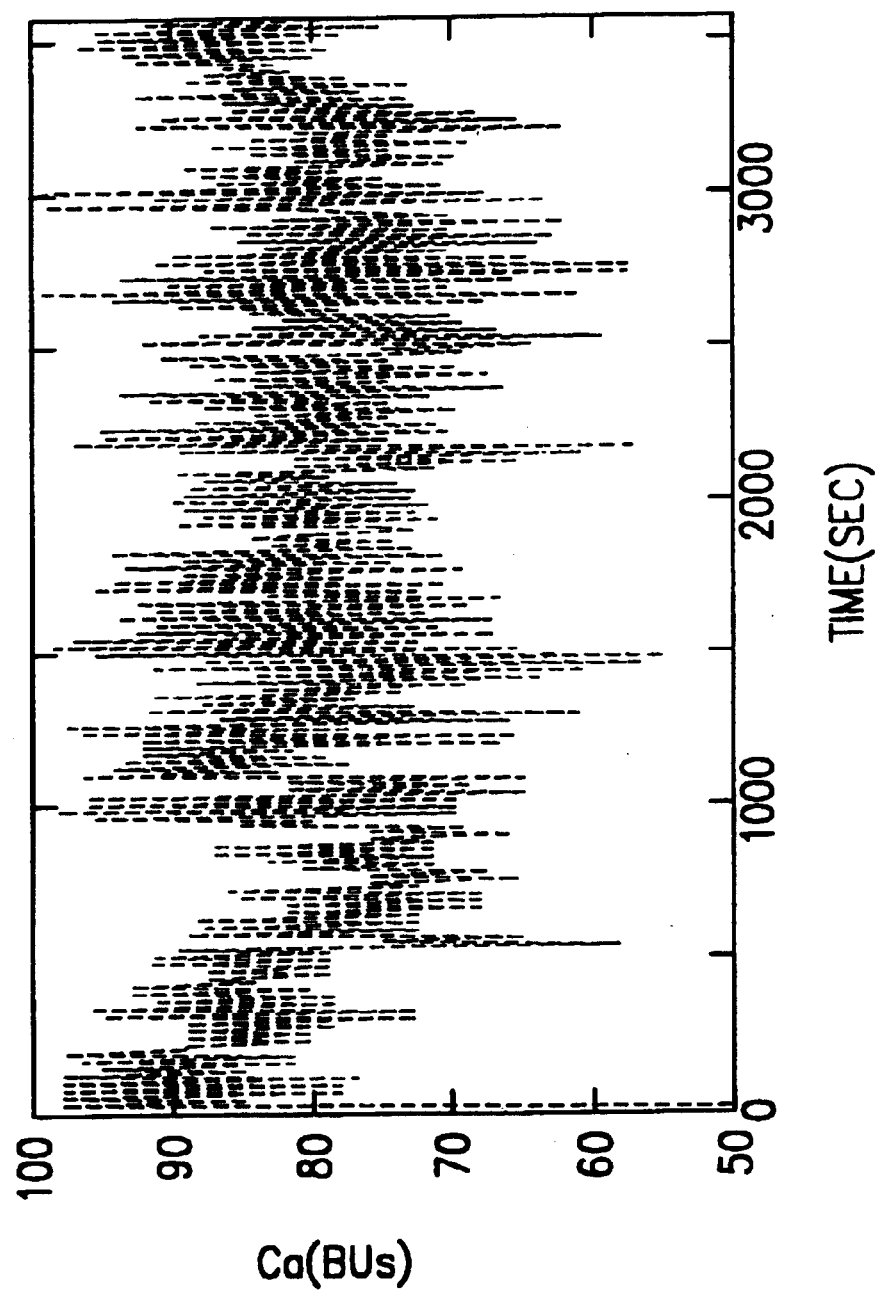

FIGS. 21A and 21B illustrate a time estimation window $T_{est}$ and reserved bandwidth R, and $C_a$ in cell 0 while increasing time, for the offered load=3.0 with high mobility for $F_1$=1.0.

Referring to FIG. 21B, it can be seen that the pattern of $C_a$ is similar to that for AC2 in FIG. 18A. It is because the admission test in CS98 is similar to T2. This is one reason for the low utilization and other reasons come from the adaptive algorithm.

Referring to FIG. 21A, it is observed that the increase or decrease of $T_{est}$ is similar to the decrease or increase of the threshold T for AC2 in FIG. 17A. The difference is the at region of $T_{est}$ (e.g., during t=[300,600] (sec)) which corresponds to a long-term period. It results from the conservative $T_{est}$ decrease policy, which corresponds to a conservative T increase policy in A1. Next, it can be seen that the R is an increasing function of $T_{est}$ and fluctuates even with the temporarily constant $T_{est}$. Therefore, the coarse granularity to adjust the reserved bandwidth is another reason.

Figure 22A:
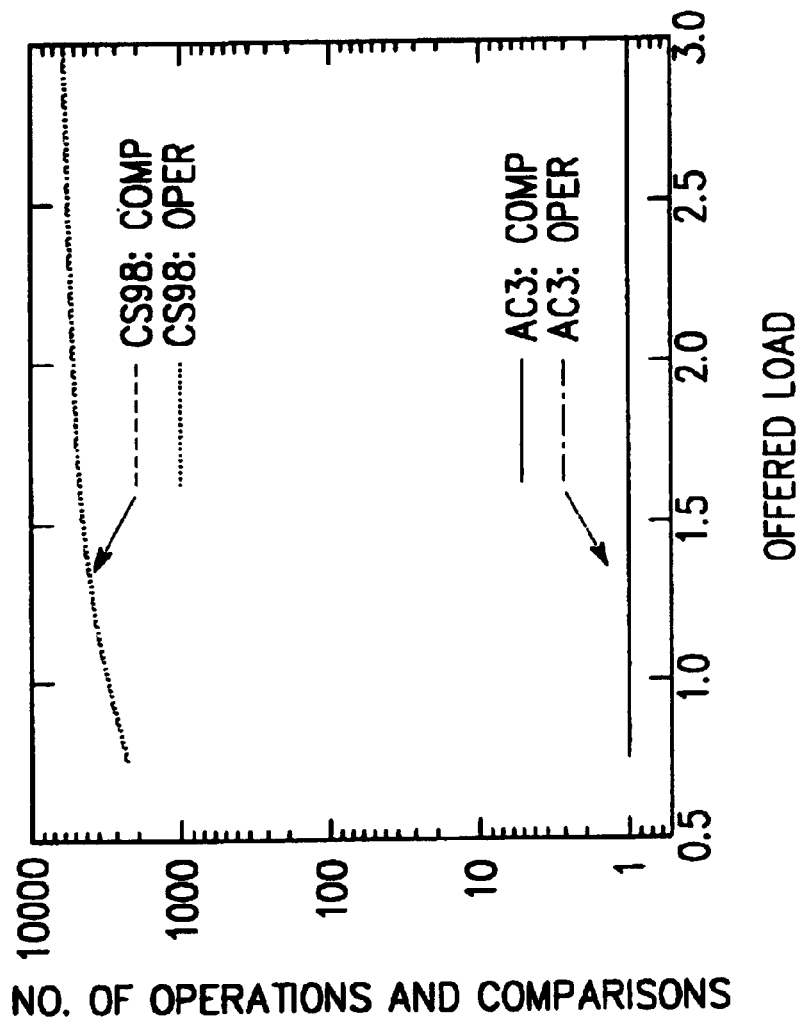
Figure 22B:
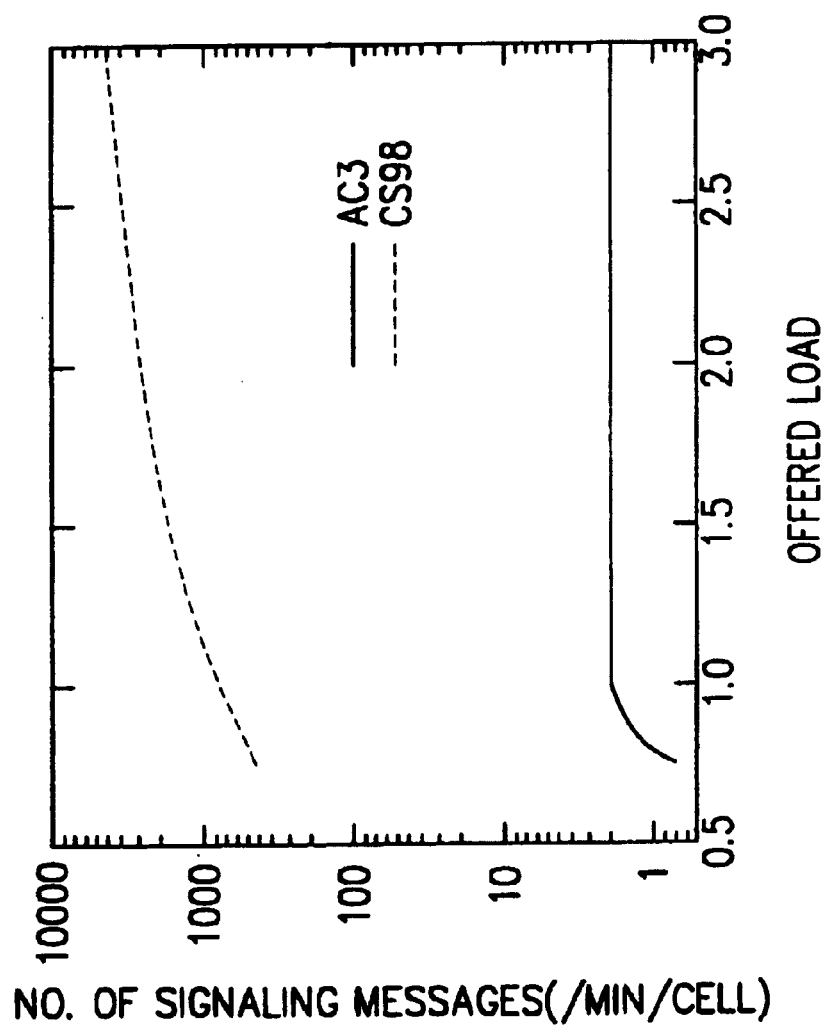

FIGS. 22A and 22B illustrate computational complexity and signaling messages of the two schemes CS98 and AC3.

First, a comparison of the computational complexity for an admission decision will be made with reference to FIG. 22A. The computational complexity of CS98 for an admission decision depends on $N_{quad}$, which is the size of cached history used for mobility estimation. FIG. 22A shows the average numbers of numerical operations (e.g., summations and multiplications) and comparisons used for an admission decision. For CS98, $N_{quad}$=1 is used, which is the simplest case. It is seen that CS98 has a considerable computational complexity. On the other hand, AC3 requires only one operation and comparison in Equation (1) for an admission decision.

Next, a comparison of the number of signaling messages among cells will be made. In CS98, when the BS of a cell i calculates the reserved bandwidth for an admission decision, it sends signaling messages to the BSs of adjacent cells $A_i$. The BS in each adjacent cell j ($\epsilon A_i$) then calculates the required bandwidth for the expected handoffs into cell i and informs this value back to cell i. As a result, at least 12 messages 14 are required for an admission decision in a cell. On the other hand, in AC3, signaling messages are comprised of (i) increase_T messages, (ii) decrease_T messages, and (iii) $\tilde{T}$ information messages. (iii) is needed (for the decision in steps 802 and 804 of FIG. 8) only when a BS increases or decreases T by receiving (i) or (ii).

FIG. 22B shows the average number of messages to be sent in each cell per minute. The number of signaling messages for CS98 linearly increases according to the offered load, because accordingly more frequent admission tests are needed. However, in AC3, the number of signaling messages are almost independent of the offered load. As a whole, AC3 shows a extremely low complexity.

As described above, the invention proposes a call admission control apparatus with a low complexity, for keeping the handoff dropping probability below a predefined level, while maximizing channel utilization.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for adaptively adjusting an admission threshold in a wireless network including a plurality of cells, wherein a base station controller associated with a particular cell of the plurality of cells adaptively adjusts the admission threshold for determining whether to admit or drop a handoff call requested from a cell adjacent to the particular cell in communication with a mobile station, to satisfy a target handoff dropping probability for guaranteeing a quality of service (QoS), the method comprising the steps of:

(a) monitoring a quantity of handoff drops versus a quantity of handoff calls occurring for an initial $L_P$ term;

(b) adjusting the admission threshold according to a result of the initial $L_P$ term monitored in step (a); and (c) repeating the steps (a) and (b) for a successive $L_P$ term, while changing a value of a second term $S_P$ until the target handoff dropping probability is satisfied during the successive $L_P$ term, which is longer than or equal to the initial $L_P$ term and includes the initial $L_P$ term.

2. The method as claimed in claim 1, wherein step (c) includes (i) decreasing the admission threshold and increasing the value of the second term $S_P$ when the target handoff dropping probability is not satisfied.

3. The method as claimed in claim 2, wherein the initial $L_P$ term is initially set to be equal to the second term $S_P$.

4. The method as claimed in claim 3, wherein the value of the successive $L_P$ term is increased in a unit of the value of the initial $L_P$ term.

5. An apparatus for adaptively adjusting an admission threshold in a wireless network including a plurality of cells, a base station controller associated with a particular cell of the plurality of cells adaptively adjusts the admission threshold for determining whether to admit or drop a handoff call requested from a cell adjacent to the particular cell in communication with a mobile station, to satisfy a target handoff dropping probability for guaranteeing a quality of service (QoS), the apparatus comprising:

a monitoring block for monitoring the number of handoff drops versus the number of occurred handoff calls for an initial $L_P$ term;

a comparator for comparing a monitoring result with the target handoff dropping probability; and an adjusting block for adjusting the admission threshold according to a comparison result output from the comparator;

wherein the monitoring block monitors a successive $L_P$ term, while changing a value of a second term $S_P$ until the target handoff dropping probability is satisfied during the second term $S_P$, which is longer than or equal to the initial $L_P$ term and includes the initial $L_P$ term, the comparator and the adjusting block performing corresponding operations according to the comparison result.

6. The apparatus as claimed in claim 5, wherein the adjusting block decreases the admission threshold and increases the value of the second term $S_P$, when the target handoff dropping probability is not satisfied.

7. The apparatus as claimed in claim 6, wherein the initial $L_P$ term is initially set to be equal to the second term $S_P$.

8. The apparatus as claimed in claim 7, wherein the value of the second term $S_P$ is increased in a unit of the value of the initial first $L_P$ term.

9. A method for adaptively adjusting an admission threshold in a wireless network including a plurality of cells, wherein a base station controller associated with a particular cell of the plurality of cells adaptively adjusts the admission threshold for determining whether to admit or drop a handoff call requested from a cell adjacent to the particular cell in communication with a mobile station, to satisfy a target handoff dropping probability for guaranteeing a quality of service (QoS), the method comprising the steps of:

(a) monitoring the number of handoff drops versus the number of occurred handoff calls for an initial $L_P$ term;

(b) adjusting the admission threshold according to the monitoring result;

(c) transmitting a message for adjusting an admission threshold in the cells adjacent to said particular cell, according to the adjustment of the admission threshold of the particular cell; and (d) repeating the steps (a) to (c) for a successive $L_P$ term, while changing a value of a second term $S_P$ until the target handoff dropping probability is satisfied during the second term $S_P$ which is longer than or equal to the initial $L_P$ term and includes the initial $L_P$ term.

10. The method as claimed in claim 9, further comprising the step of decreasing the admission threshold and increasing the value of the second term $S_P$, when the target handoff dropping probability is not satisfied.

11. The method as claimed in claim 9, wherein the initial $L_P$ term is initially set to be equal to the second term $S_P$.

12. The method as claimed in claim 11, wherein the value of the second term $S_P$ is increased in a unit of the value of the initial $L_P$ term.

13. An apparatus for adaptively adjusting an admission threshold in a wireless network including a plurality of cells, wherein a base station controller associated with a particular cell of the plurality of cells adaptively adjusts the admission threshold for determining whether to admit or drop a handoff call requested from a cell adjacent to the particular cell in communication with a mobile station, to satisfy a target handoff dropping probability for guaranteeing a quality of service (QoS), the apparatus comprising:

a monitoring block for monitoring the number of handoff drops versus the number of occurred handoff calls for an initial $L_P$ term;

a comparator for comparing the monitoring result with the target handoff dropping probability;

an adjusting block for adjusting the admission threshold according to a comparison result output from the comparator; and a message transmission block for transmitting a message for adjusting an admission threshold in the cells adjacent to said particular cell, according to an adjustment of the admission threshold of the particular cell;

wherein the monitoring block monitors a successive $L_P$ term, while changing a value of a second term $S_P$ until the target handoff dropping probability is satisfied during the second term $S_P$, which is longer than or equal to the initial $L_P$ term and includes the initial $L_P$ term, and the comparator, the adjusting block and the message transmission block perform corresponding operations according to the comparison result.

14. The apparatus as claimed in claim 13, wherein the adjusting block decreases the admission threshold and increases the value of the second term $S_P$, when the target handoff dropping probability is not satisfied.

15. The apparatus as claimed in claim 14, wherein the initial $L_P$ term is initially set to be equal to the second term $S_P$.

16. The apparatus as claimed in claim 15, wherein the value of the second term $S_P$ is increased in a unit of the value of the initial $L_P$ term.

17. A method for controlling admission of a requested handoff call in a wireless network including a plurality of cells, wherein one of a base station controller associated with a particular cell of the plurality of controls admission of the requested handoff call, when a handoff call is requested to one of a plurality of cells adjacent to the particular cell in communication with a mobile station, the method comprising the steps of:

(a) upon receipt of a new call request to the adjacent cell, comparing a sum of an allocated bandwidth of said adjacent cell and a bandwidth for the requested new call with an admission threshold of said adjacent cell, and determining whether to admit or block the requested new call;

(b) monitoring the number of handoff drops versus the number of requested handoff calls for an initial $L_P$ term;

(c) adjusting the admission threshold according to the monitoring result and a target handoff dropping probability for guaranteeing a quality of service (QoS);

(d) transmitting a message for adjusting an admission threshold in the cells adjacent to said particular cell, according to adjustment of the admission threshold of the particular cell; and (e) repeating the steps (b) to (d) for a successive $L_P$ term, while changing a value of a second term $S_P$ until a target call blocking probability is satisfied during the second term $S_P$ which is longer than or equal to the initial $L_P$ term and includes the initial $L_P$ term.

18. The method as claimed in claim 17, further comprising the step of decreasing the admission threshold and increasing the value of the second term $S_P$, when the target handoff dropping probability is not satisfied.

19. The method as claimed in claim 17, wherein the initial $L_P$ term is initially set to be equal to the second term $S_P$.

20. The method as claimed in claim 19, wherein the value of the second term $S_P$ is increased in a unit of the value of the initial $L_P$ term.

21. The method as claimed in claim 17, wherein step (a) comprises the step of determining to admit the requested new call, when the sum is less than or equal to the admission threshold of said adjacent cell.

22. An apparatus for controlling admission of a requested handoff call in a wireless network including a plurality of cells, wherein a mobile station controls admission of the requested handoff call, when a handoff call is requested to one of a plurality of cells adjacent to the particular cell in communication with the mobile station method comprising the steps of:

- a call admitting/dropping decision block for comparing, upon receipt of a new call request to the adjacent cell, a sum of an allocated bandwidth of said adjacent cell and a bandwidth for the requested new call with an admission threshold of said adjacent cell, and determining whether to admit or block the requested new call;
- a monitoring block for monitoring the number of handoff drops versus the number of requested handoff calls for an initial $L_P$ term;
- a comparator for comparing the monitoring result with a target handoff dropping probability for guaranteeing a quality of service (QoS);
- an adjusting block for adjusting the admission threshold according to the comparison result;
- a message transmission block for transmitting a message for adjusting an admission threshold in the cells adjacent to said particular cell according to an adjustment of the admission threshold of the particular cell; and
- a monitoring block for monitoring a successive $L_P$ term, while changing a value of a second term $S_P$ until a target call blocking probability is satisfied during the second term $S_P$ which is longer than or equal to the initial $L_P$ term and includes the initial $L_P$ term.

23. The apparatus as claimed in claim 22, wherein the adjusting block decreases the admission threshold and increases the value of the second term $S_P$, when the target handoff dropping probability is not satisfied.

24. The apparatus as claimed in claim 22, wherein the initial $L_P$ term is initially set to be equal to the second term $S_P$.

25. The apparatus as claimed in claim 24, wherein the value of the second term $S_P$ is increased in unit of the value of the initial $L_P$ term.

26. The apparatus as claimed in claim 22, wherein the call admitting/dropping decision block determines to admit the requested new call, when the sum is less than or equal to the admission threshold of adjacent cell.

* * * * *